US012785758B2

(12) United States Patent
Park et al.

(10) Patent No.: US 12,785,758 B2
(45) Date of Patent: Nov. 3, 2026

(54) WIRELESS DATA TRANSMISSION AND RECEPTION METHOD AND SYSTEM BASED ON DISTRIBUTED BEAMFORMING

(71) Applicant: AGENCY FOR DEFENSE DEVELOPMENT, Daejeon (KR)

(72) Inventors: Cheol Sun Park, Daejeon (KR); Sun Phil Nah, Daejeon (KR); Sung Jin Jo, Daejeon (KR); Seon Kyo Kim, Daejeon (KR); Gyung Min Kim, Daejeon (KR); Jae Won Chang, Daejeon (KR)

(73) Assignee: Agency for Defense Development, Daejeon (KR)

( * ) Notice: Subject to any disclaimer, the term of this patent is extended or adjusted under 35 U.S.C. 154(b) by 122 days.

(21) Appl. No.: 18/669,937

(22) Filed: May 21, 2024

(65) Prior Publication Data

US 2025/0300695 A1 Sep. 25, 2025

(30) Foreign Application Priority Data

Mar. 22, 2024 (KR) ........................ 10-2024-0040005

(51) Int. Cl.
*H04B 7/024* (2017.01)
*H04B 7/0426* (2017.01)
*H04B 7/06* (2006.01)

(52) U.S. Cl.
CPC ............ *H04B 7/024* (2013.01); *H04B 7/043* (2013.01); *H04B 7/0617* (2013.01)

(58) Field of Classification Search
CPC ...... H04B 7/024; H04B 7/043; H04B 7/0617; H04B 7/0632; H04B 7/18502; H04B 17/318; H04B 17/336; H04W 84/047
See application file for complete search history.

(56) References Cited

U.S. PATENT DOCUMENTS

2005/0188087 A1* 8/2005 Iyoda ...................... G06F 9/505 709/208
2014/0301494 A1* 10/2014 Hsu ........................ H04B 7/026 375/267

(Continued)

FOREIGN PATENT DOCUMENTS

KR 10-2017-0019881 A 2/2017
KR 10-2024-0023473 A 2/2024

OTHER PUBLICATIONS

Office Action received in Korean Application No. 10-2024-0040005 dated May 14, 2025.

(Continued)

*Primary Examiner* — Vineeta S Panwalkar
(74) *Attorney, Agent, or Firm* — Knobbe, Martens, Olson & Bear, LLP

(57) ABSTRACT

Proposed is a method for transmitting and receiving data based on distributed beamforming performed by a distributed beamforming-based data transmission and reception system including ground operation equipment and a plurality of distributed nodes. The method may include determining a master node among the plurality of nodes through the ground operation equipment, and forming a data transmission and reception channel based on a signal reception level between the master node and a slave node. The method may also include transmitting and receiving data between the master node and the slave node through the formed data transmission and reception channel.

17 Claims, 20 Drawing Sheets

(56) References Cited

U.S. PATENT DOCUMENTS

| | | | | |
|---|---|---|---|---|
| 2019/0174149 | A1* | 6/2019 | Zhang | H04N 21/4728 |
| 2020/0099441 | A1* | 3/2020 | Stein | G08G 5/59 |

OTHER PUBLICATIONS

Misra et al., "Dynamic Leader Selection in a Master-Slave", 2021 IEEE Global Communications Conference (Globecom), DOI:10.1109/Globecom46510.2021.9685538, (Dec. 11, 2021).

Zhou et al., "Beam Management and Self-healing for mmWaveUAV Mesh Networks", IEEE Transactions on Vehicular Technology, vol. 68, Iss. 2, (Feb. 2019).

* cited by examiner

| MCS | 0 | 1 | 2 | 3 | 4 | 5 | 6 | 7 | 8 | 9 | 10 | 11 | 12 | 13 | 13 |
|---|---|---|---|---|---|---|---|---|---|---|---|---|---|---|---|
| Modulation | BPSK | QPSK | | 16-QAM | | 64-QAM | | | 256-QAM | | 1024 -QAM | | 4096 QAM | | BPSK -DCM |
| Coding Rate | 1/2 | 1/2 | 3/4 | 1/2 | 3/4 | 2/3 | 3/4 | 5/6 | 3/4 | 5/6 | 3/4 | 5/6 | 3/4 | 5/6 | 1/2 |

<MCS table of Wi-Fi 7>

<High order modulation for Wi-Fi 7>

<Wi-Fi 7 resource allocation >

WIRELESS DATA TRANSMISSION AND RECEPTION METHOD AND SYSTEM BASED ON DISTRIBUTED BEAMFORMING

CROSS-REFERENCE TO RELATED APPLICATION

This application claims priority to Korean Patent Application No. 10-2024-0040005, filed on Mar. 22, 2024, the entirety of which is incorporated herein by reference for all purposes.

TECHNICAL FIELD

The present disclosure relates to a method for transmitting and receiving data for performing beamforming using a distributed array antenna. More specifically, the present disclosure relates to a method and system for simultaneously transmitting and receiving a large amount of wireless data between distributed elements using an array antenna composed of physically distributed elements to perform beamforming.

BACKGROUND

In modern warfare, technology for operating multiple unmanned, autonomous, and intelligent weapon systems with a small number of troops is actively being applied to respond immediately and flexibly to rapidly changing battlefield environments.

In this regard, it is possible to deploy a plurality of drones equipped with antennas and transceivers in a distributed manner and use in electronic warfare the plurality of drones as an unmanned weapon system for surveillance, reconnaissance and for ground defense purposes. When using drones as unmanned weapon systems for surveillance and reconnaissance, a beamforming method using an array antenna composed of antennas mounted on the drones may be implemented by simultaneously utilizing a plurality of drones distributed in a suitable pattern for target radio frequency (RF) signal characteristics and operating frequency band.

SUMMARY

An object of the present disclosure is to provide a wireless data transmission and reception method and system based on distributed beamforming for implementing a beamforming method using a plurality of distributed moving objects capable of wireless signal transmission and reception.

However, the problem to be solved by the present disclosure is not limited to that mentioned above, and other problems to be solved that are not mentioned may be clearly understood by those of ordinary skill in the art to which the present disclosure belongs from the following description.

In accordance with an aspect of the present disclosure, there is provided a method for transmitting and receiving data based on distributed beamforming performed by a distributed beamforming-based data transmission and reception system including ground operation equipment and a plurality of distributed nodes, the method comprises determining a master node among the plurality of nodes through the ground operation equipment, forming a data transmission and reception channel based on a signal reception level between the master node and a slave node and transmitting and receiving data between the master node and the slave node through the formed data transmission and reception channel.

The determining the master node may determine the master node among the plurality of nodes based on at least one of location information of each node, a transmission bandwidth, and an MCS level used in a wireless link, and determines remaining nodes other than the master node as slave nodes.

The master nodes may be two or more, and the slave nodes may be allocated to corresponding to each master nodes respectively.

The determining the master node may determine the master node based on transmission efficiency when data is transmitted from the slave node to the master node, and the transmission efficiency may be determined based on a signal-to-noise ratio (SNR).

The transmission efficiency may be determined as $$\eta_j = \sum_{i=0, i\neq j}^{N} \log_2(1+\mu_{j,i}),\ \eta_j$$

is the transmission efficiency, N is the number of slave nodes, and $\mu_{j,i}$ is the signal-to-noise ratio.

The signal-to-noise ratio $\mu_{j,i}$ may be determined as $\mu_{j,i}=r_{j,i}/N_j$, $r_{j,i}$ is a received signal strength when data transmitted from an i-th node is received by a j-th node, and $N_j$ is a noise signal strength.

The received signal strength may be determined as $r_{j,i}=P_iG_iG_jL_{j,i}$, $P_i$ is a transmission strength of the i-th node, $G_i$ is a transmission antenna gain of the i-th node, $G_j$ is a reception antenna gain of the j-th node, $L_{j,i}$ is path loss $(4\pi f_c d_{j,i}/c)^2$ according to a distance $d_{j,i}$ between the i-th node and the j-th node, c is the speed of light, $f_c$ is a carrier frequency used when data is transmitted from the i-th node to the j-th node.

The noise signal strength nay be determined as $N_j=-174$ (dBm/Hz)+NF+10 $\log_{10} W_j$, $W_j$ is a bandwidth of radio resources allocated to the j-th node, and NF is a receiver noise figure.

An index of a node capable of maximizing the transmission efficiency may be determined as $$j_{Master} = \underset{j\in|0,\ \dots,\ N|}{\operatorname{argmax}} \sum_{i=0, i\neq j}^{N} \log_2(1+\mu_{j,i}),$$

and the node capable of maximizing the transmission efficiency may be determined as the master node.

The determining a master node may determine a node capable of maximizing a real-time transmission rate when data is transmitted from the slave node to the master node as the master node, and the real-time transmission rate may be determined based on a number of transmission bits and a coding rate according to a modulation method.

The index of the master node capable of maximizing the real-time transmission rate may be determined as $$j_{Master} = \underset{j\in|0,\ \dots,\ N|}{\operatorname{argmax}} \sum_{i=0, i\neq j}^{N} \alpha_{j,i}\beta_{j,i}W_i,$$

j is the index of the randomly selected master node, $\alpha_{j,i}$ is the number of transmission bits according to the modulation method, $\beta_{j,i}$ is the coding rate, and $W_i$ is a bandwidth used when data is transmitted from the i-th node to the j-th node.

The method may further comprise configuring a communication method of a control channel by checking a quality of a communication channel between the master node and the ground operation equipment.

The communication channel quality may include at least one of a signal-to-noise ratio of a transmission and reception signal environment and an MCS level information of a communication channel.

The communication method of the control channel may be one of a direct path method and an N-hop relay method.

The configuring a communication method of a control channel may include determining a number of relay nodes based on at least one of location information between the ground operation equipment and the plurality of nodes, the signal-to-noise ratio of the transmission and reception signal environment, and MCS level information of a communication channel when the communication method of the control channel is configured as the N-hop relay method. The forming the data transmission and reception channel may configure the data transmission and reception channel including the relay nodes.

The slave nodes may be two or more. The relay node may be determined from among the slave nodes. The configuring the communication method of the control channel may include calculating the index of the slave node determined as the relay node based on at least one of location information of each slave node, a signal-to-noise ratio of a transmission and reception signal environment, and MCS level information of a communication channel, and the forming a data transmission and reception channel forms the data transmission and reception channel based on index information of the slave nodes determined as the relay node and a changed number of slave nodes.

In accordance with an aspect of the present disclosure, there is provided a method for determining a master node performed by ground operation equipment, the method comprises receiving at least one of location information of each node, transmission bandwidth, MCS level used in a wireless link, and signal-to-noise ratio (SNR) from a plurality of distributed nodes, determining a master node from among the plurality of nodes and a slave node allocated to the master node based on the received information and propagating a node determination frame reflecting the determination result to each node.

The node determination frame may include at least one of master node determination information, slave node determination information, information on the number of mater nodes and indexes of the master nodes, information on the number of slave nodes and indexes of the slave nodes, an index of a sub-channel allocated to each node, and sub-channel bandwidth information.

In accordance with an aspect of the present disclosure, there is provided a method for receiving data based on distributed beamforming performed by a master node, the method comprises receiving a master node control frame from ground operation equipment, transmitting a signal collection command frame to a slave node allocated to the master node, receiving a signal collection data frame from the slave node and generating a signal detection data frame based on the received signal collection data frame and transmitting the signal detection data frame to the ground operation equipment.

The master node control frame may include at least one of information on the number of relay nodes used, information on the index of the slave node allocated to the master node, information on the number of distributed beamforming channels, and a signal transmission and reception command.

The signal collection command frame may include at least one of a frequency range, a signal collection bandwidth, and signal detection threshold information.

The signal collection data frame may include at least one of channel quality information (CQI), which is channel quality information of a sub-channel used, an MCS level used to suit a channel quality status at a time of generating the signal collection data frame, real-time location information of the slave node, the frequency of a collected/detected target RF signal, correction data which is collected frequency phase/time delay information, digitizing of a collected RF signal and frequency down-converted IF data.

The signal detection data frame may include at least one of beamforming received using multi-channel IF data, the number of signals detected by performing direction detection signal processing, frequency information, signal strength, demodulation result, signal detection band spectrum data, CQI of the slave node for each channel, and location information of each node.

In accordance with an aspect of the present disclosure, there is provided a method for transmitting data based on distributed beamforming performed by a slave node, the method comprises receiving a slave node control frame from ground operation equipment, generating an RF signal and transmitting the RF signal for beamforming transmission and generating a signal transmission result frame reflecting the transmission result and transmitting the signal transmission result frame to the ground operation equipment.

The slave node control frame may include at least one of information on the number of slave nodes, an index of the slave nodes, an index of an allocated sub-channel, a bandwidth of the sub-channel, information on the number of designated relay nodes used, and transmission signal information.

The signal transmission result frame may include at least one of CQI, which is channel quality information of a sub-channel used, an MCS level used to suit a channel quality state at the time of generating the signal transmission result frame, real-time location information of the slave nodes, and beamforming transmission result data.

In accordance with another aspect of the present disclosure, there is provided a ground operation equipment, the ground operation equipment comprises a memory capable of storing computer-executable instructions and a processor configured to perform a method, by executing the instructions, the method comprises receiving at least one of location information of each node, a transmission bandwidth, an MCS level used in a wireless link, and a signal-to-noise ratio (SNR) from a plurality of distributed nodes, determining a master node from among the plurality of nodes and a slave node allocated to the master node based on the received information and propagating a node determination frame reflecting the determined result to each node.

In accordance with another aspect of the present disclosure, there is provided a computer-readable storage medium storing computer-executable instructions, the computer-executable instructions causing, by being executed by a processor, the processor to perform a method, the method comprises receiving at least one of location information of each node, a transmission bandwidth, an MCS level used in a wireless link, and a signal-to-noise ratio (SNR) from a plurality of distributed nodes, determining a master node from among the plurality of distributed nodes and slave nodes allocated to the master node based on the received information and propagating a node determination frame reflecting the determined result to each node.

According to the present disclosure, for beamforming transmission and reception of a target RF signal in a required frequency band, a wireless data transmission and reception method based on distributed beamforming can be implemented using a plurality of distributed moving objects capable of wireless signal transmission and reception.

Specifically, wireless data transmission and reception based on distributed beamforming can be performed by determining a master node and slave nodes among distributed moving objects equipped with RF signal transceivers, securing a stable communication channel connected with ground operation equipment, and configuring a wireless data transmission and reception channel for allocating radio resources that allow multiple nodes to access simultaneously.

Additionally, an RF signal for a target signal in a required frequency band can be processed by transceivers of distributed moving objects. To this end, it is possible to transmit and share intermediate frequency (IF) signals processed into digital signals in the form of data frames between the master node and slave nodes through a wireless data transmission and reception channel based on distributed beamforming.

composed of M multiple master nodes and N slave nodes are allocated.

Figure 6:
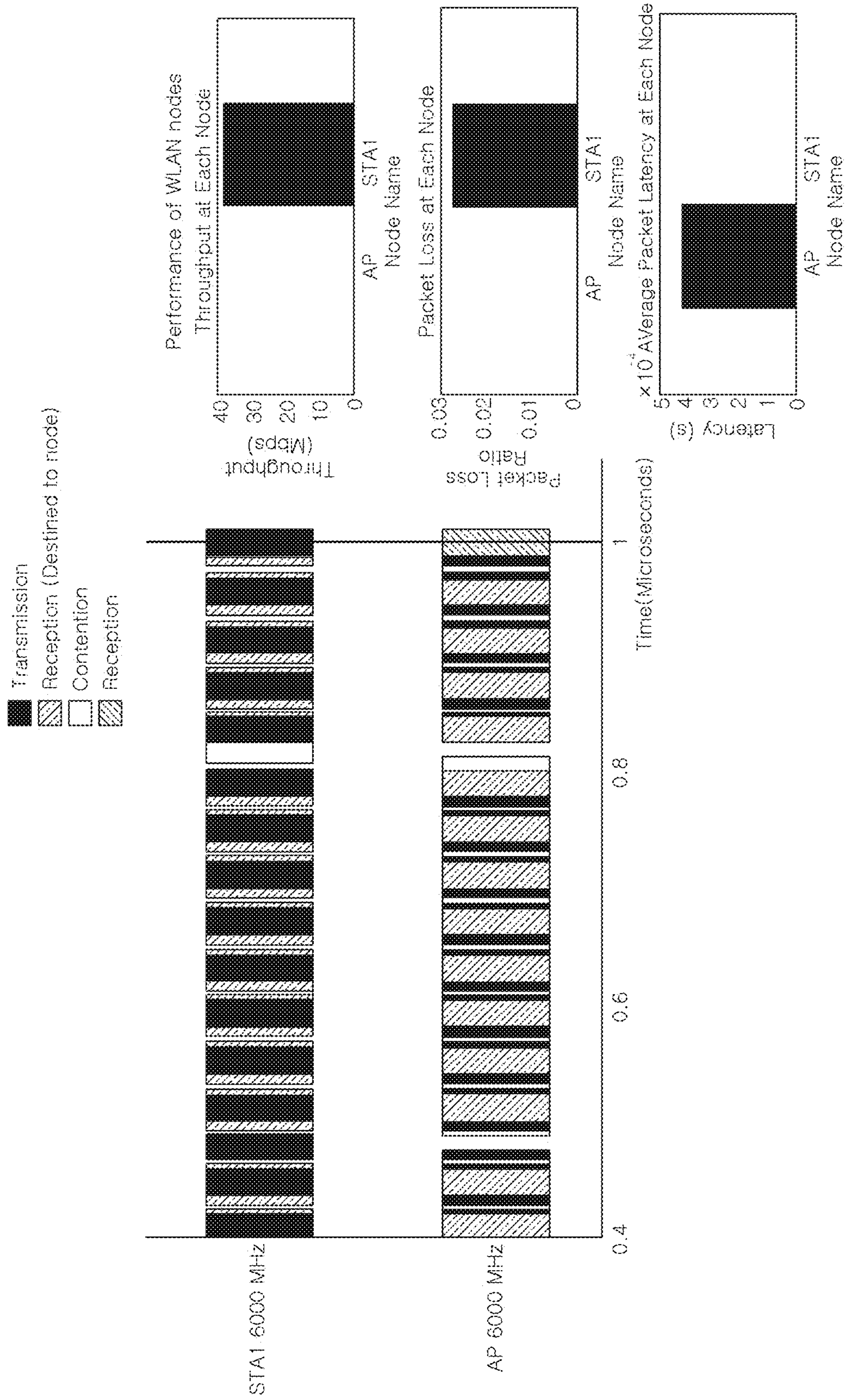
FIG. 6 shows a data communication processing rate of each node, a packet loss rate of each node, and an average packet waiting time in a case where a single node per sub-channel with a bandwidth of 20 MHz utilizes radio resources and 16 nodes simultaneously transmit and receive data in an orthogonal frequency division multiple access system with a bandwidth of 320 MHz.
Figure 9:
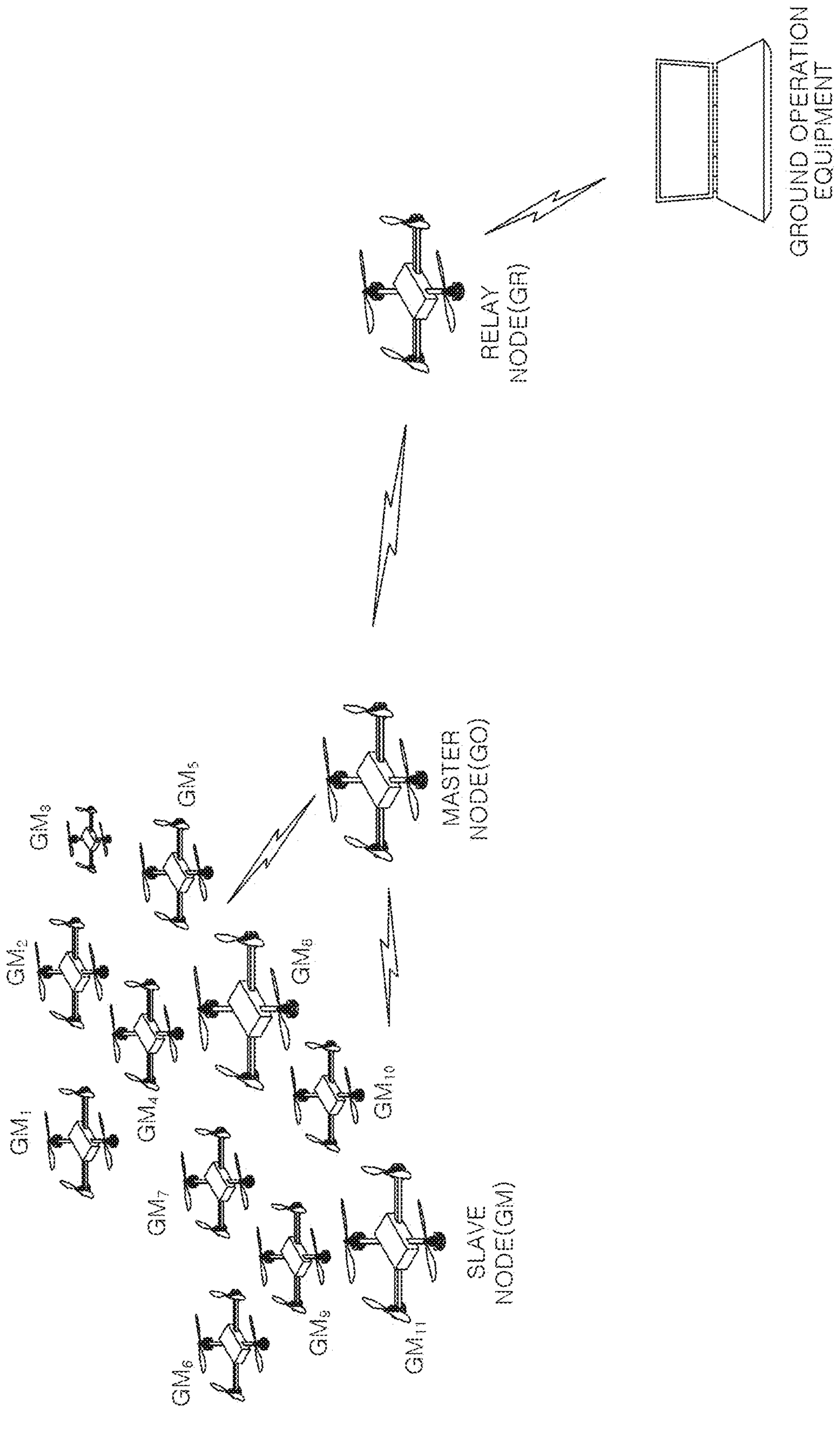

FIG. 9 is a diagram showing a data transmission and reception link configuration in which a relay node GR (group relay) is allocated to support long-distance data communication for the data transmission and reception link of FIG. 6.

Figure 7:
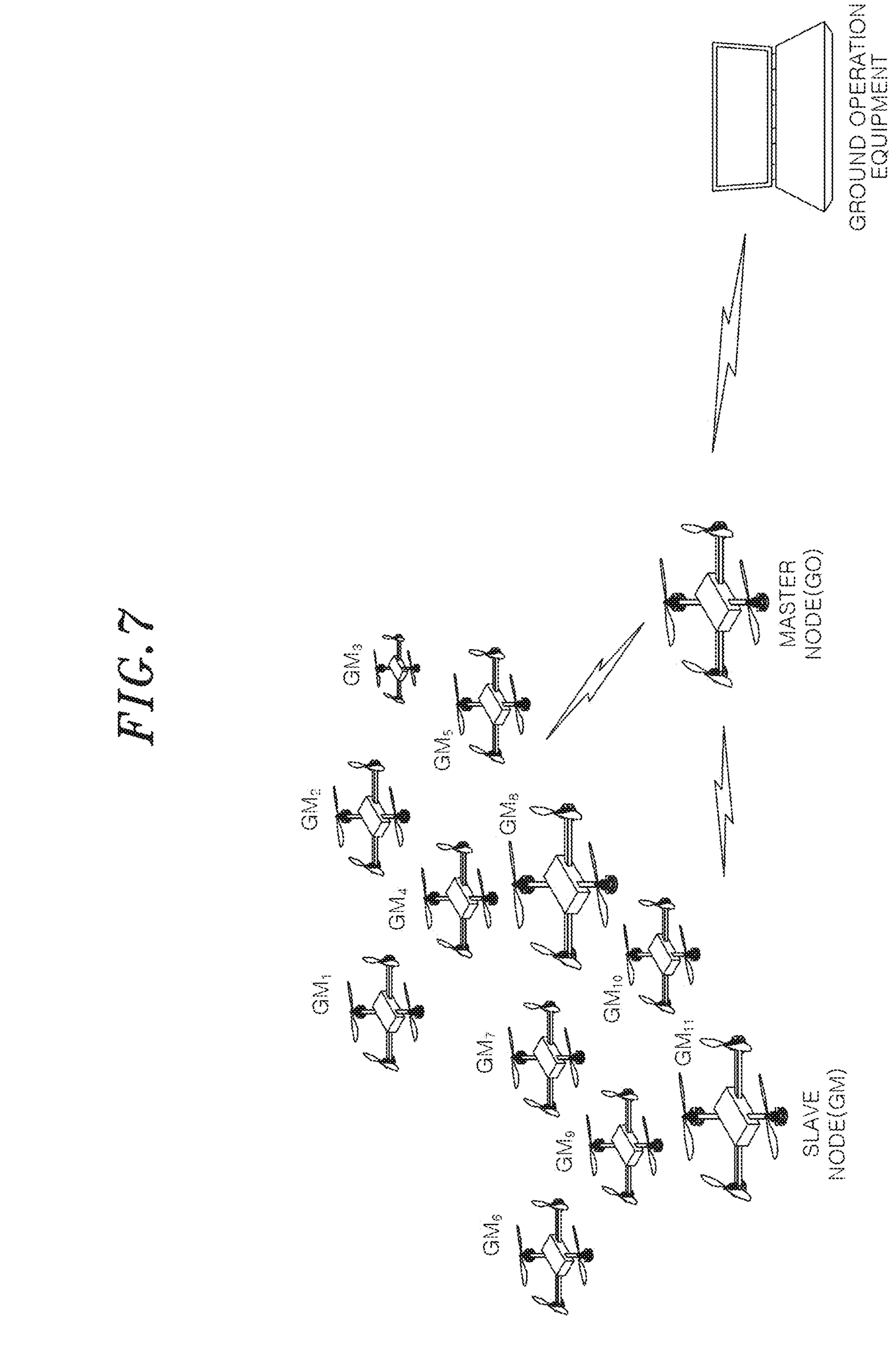
FIG. 7 is a diagram showing a data transmission and reception link configuration in which a single master node (GO, group owner) and a single slave node group (GM, group member) are allocated to moving objects distributed through ground operation equipment control.
Figure 10:
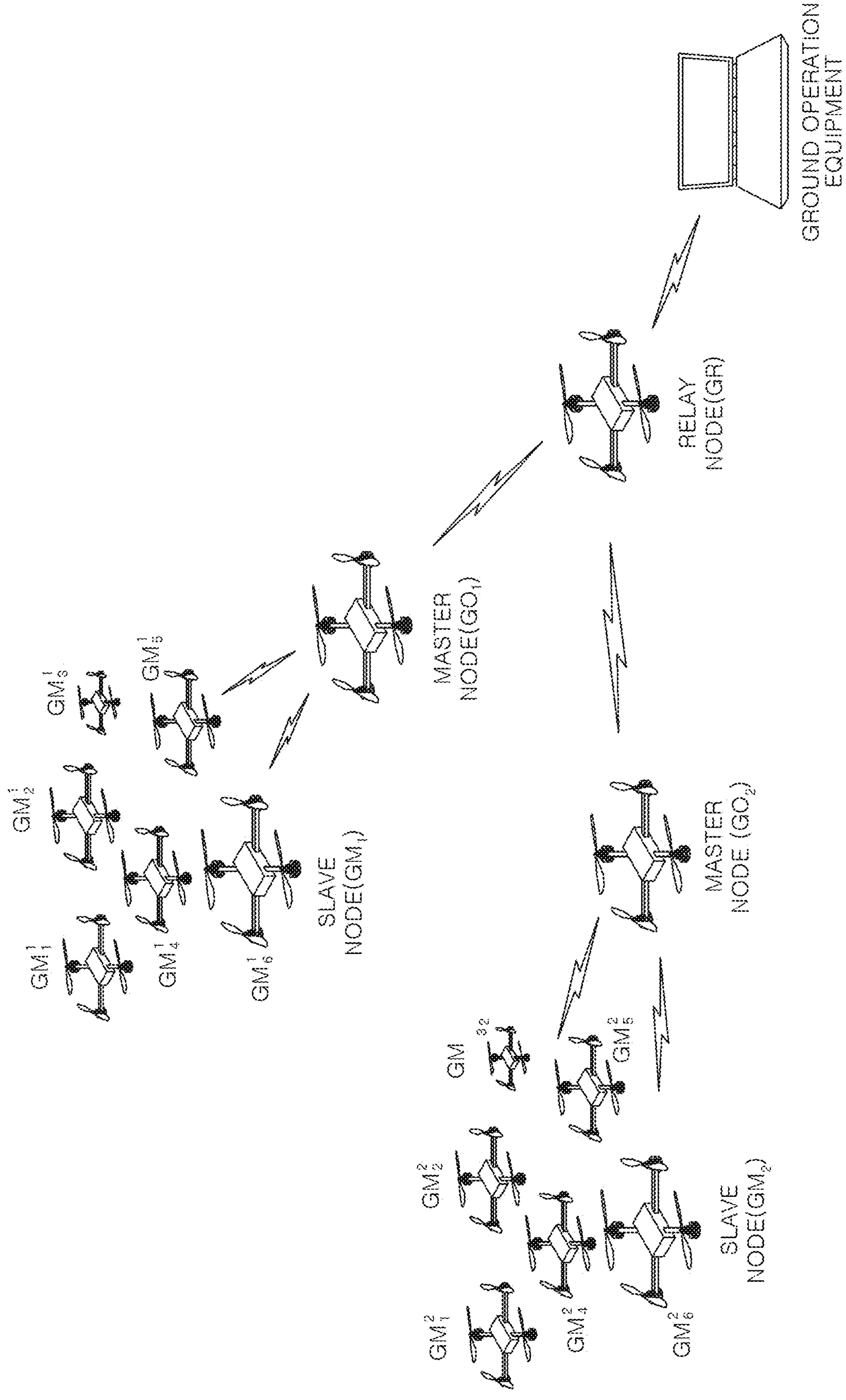

FIG. 10 is a diagram showing a data transmission and reception link configuration in which a relay node GR is allocated to support long-distance data communication for the data transmission and reception link of FIG. 7.

Figure 11:
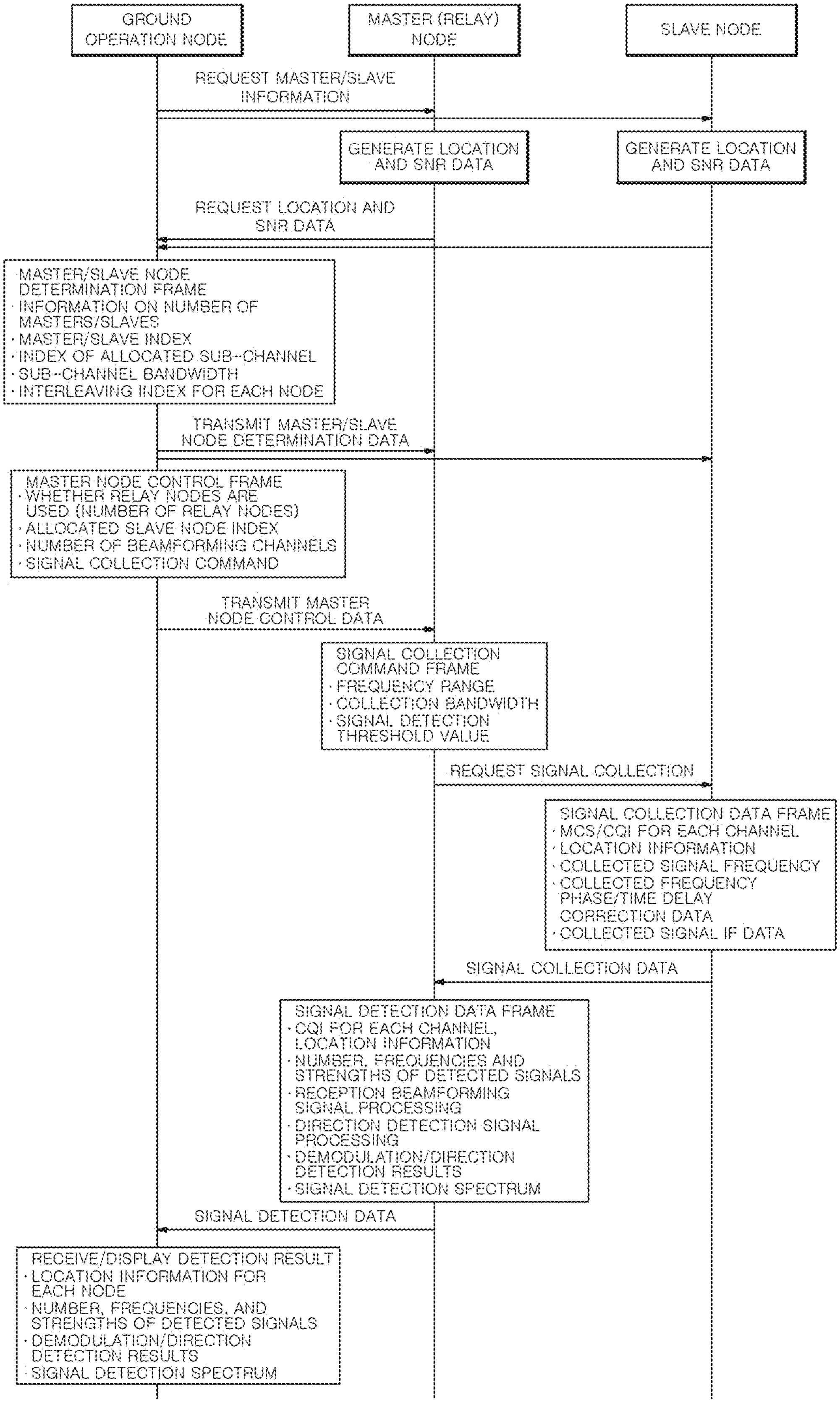

FIG. 11 illustrates a message flow for implementing a distributed beamforming reception method using a master node and a slave node.

Figure 12:
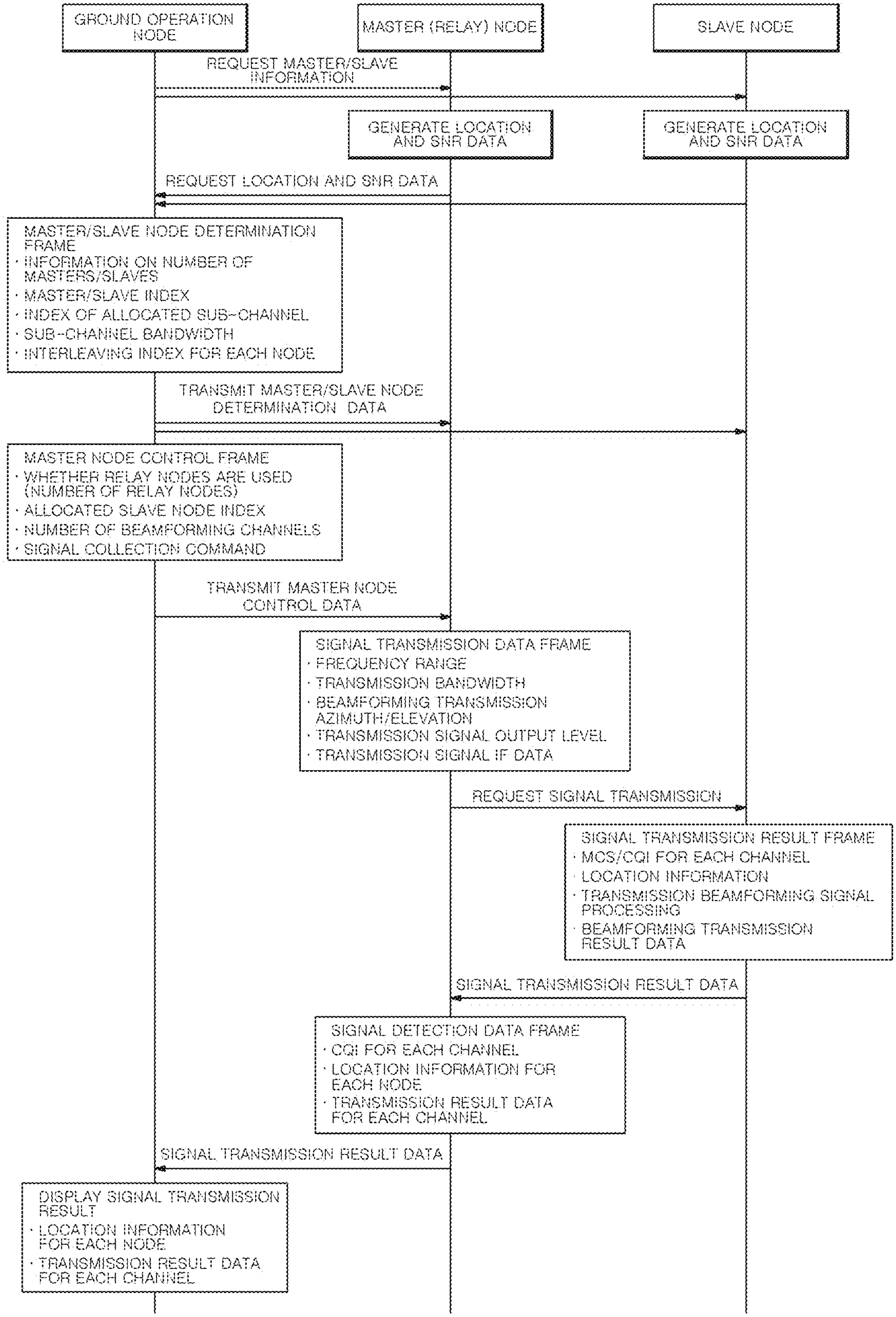

FIG. 12 illustrates a message flow for implementing a distributed beamforming transmission method using a master node and a slave node.

Figure 13:
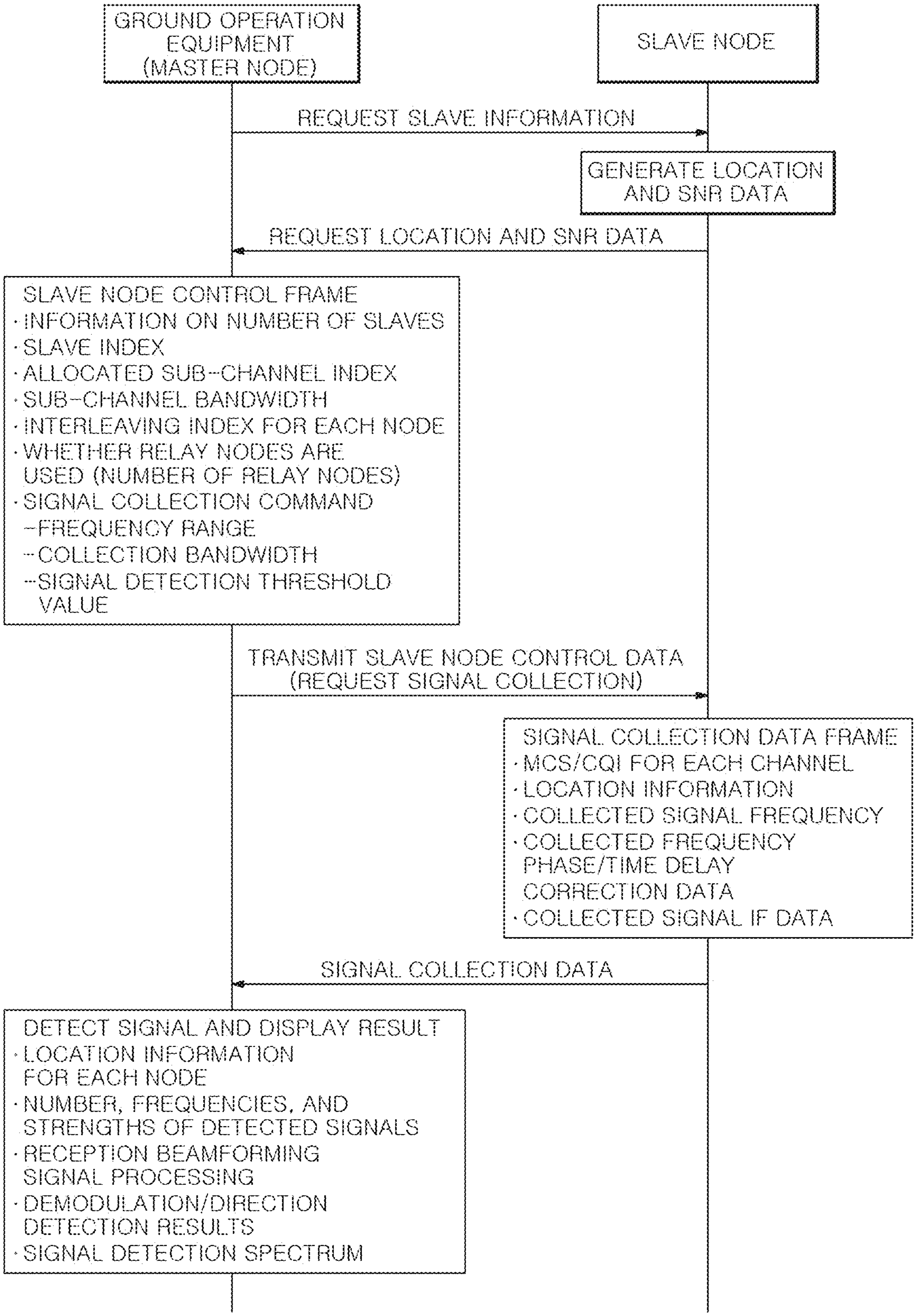

FIG. 13 illustrates a message flow through which ground operation equipment serves as a master node to implement a distributed beamforming reception method.

Figure 14:
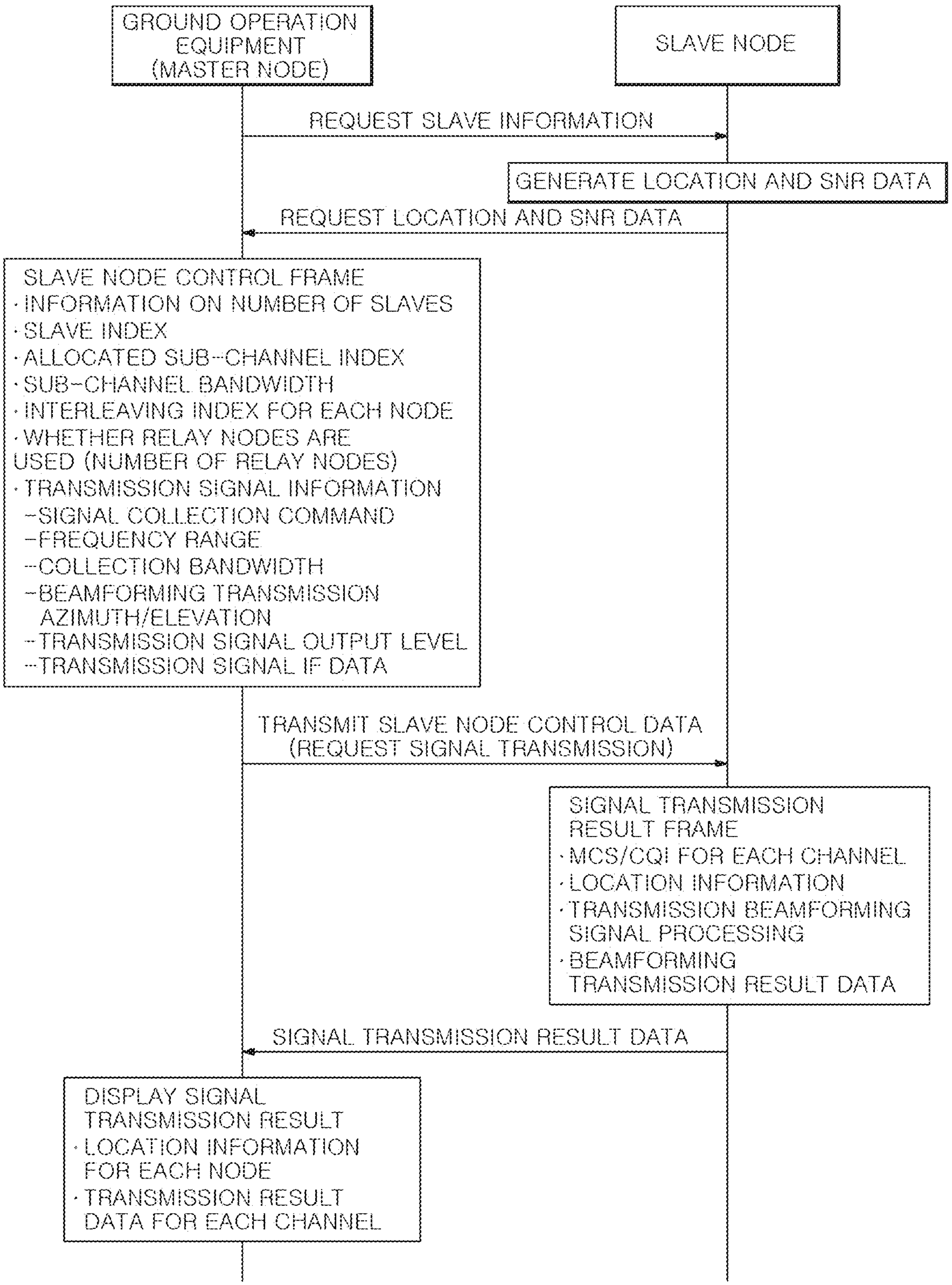

FIG. 14 illustrates a message flow diagram through which ground operation equipment serves as a master node to implement a distributed beamforming transmission method.

Figure 15:
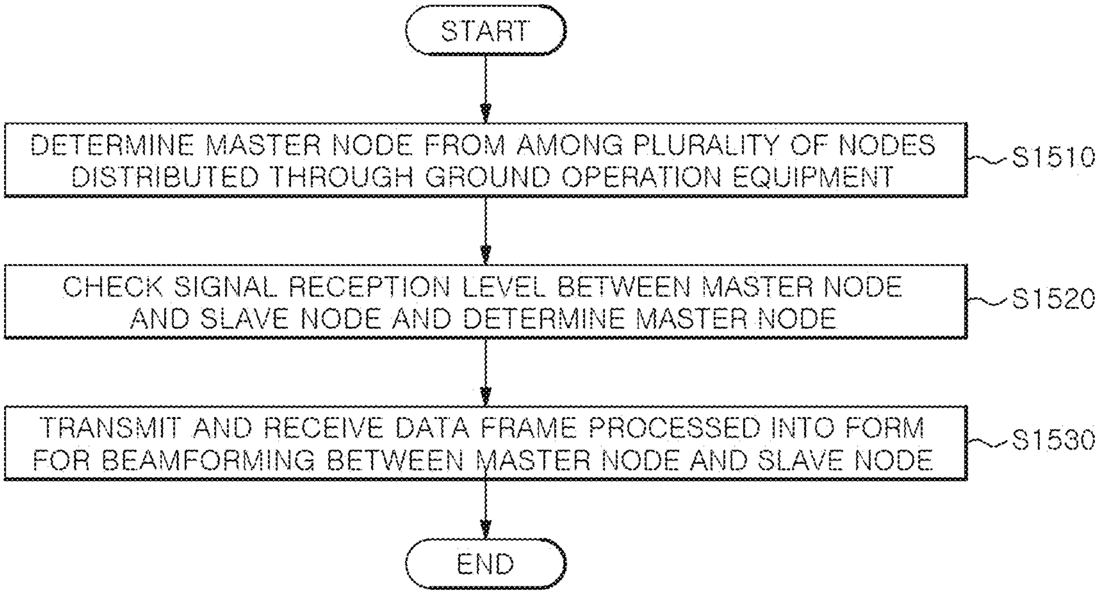

FIG. 15 is a flowchart illustrating a method for transmitting and receiving data based on distributed beamforming according to a first aspect of the present disclosure.

Figure 16:
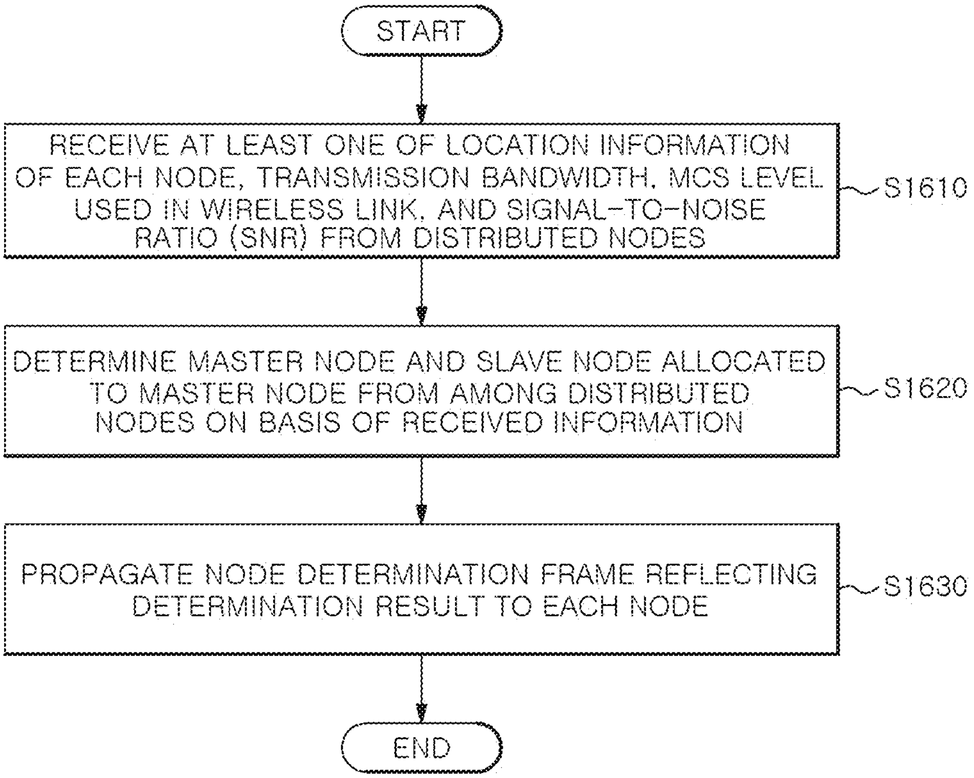

FIG. 16 is a flowchart illustrating a method of determining a master node according to another embodiment of the first aspect of the present disclosure.

Figure 17:
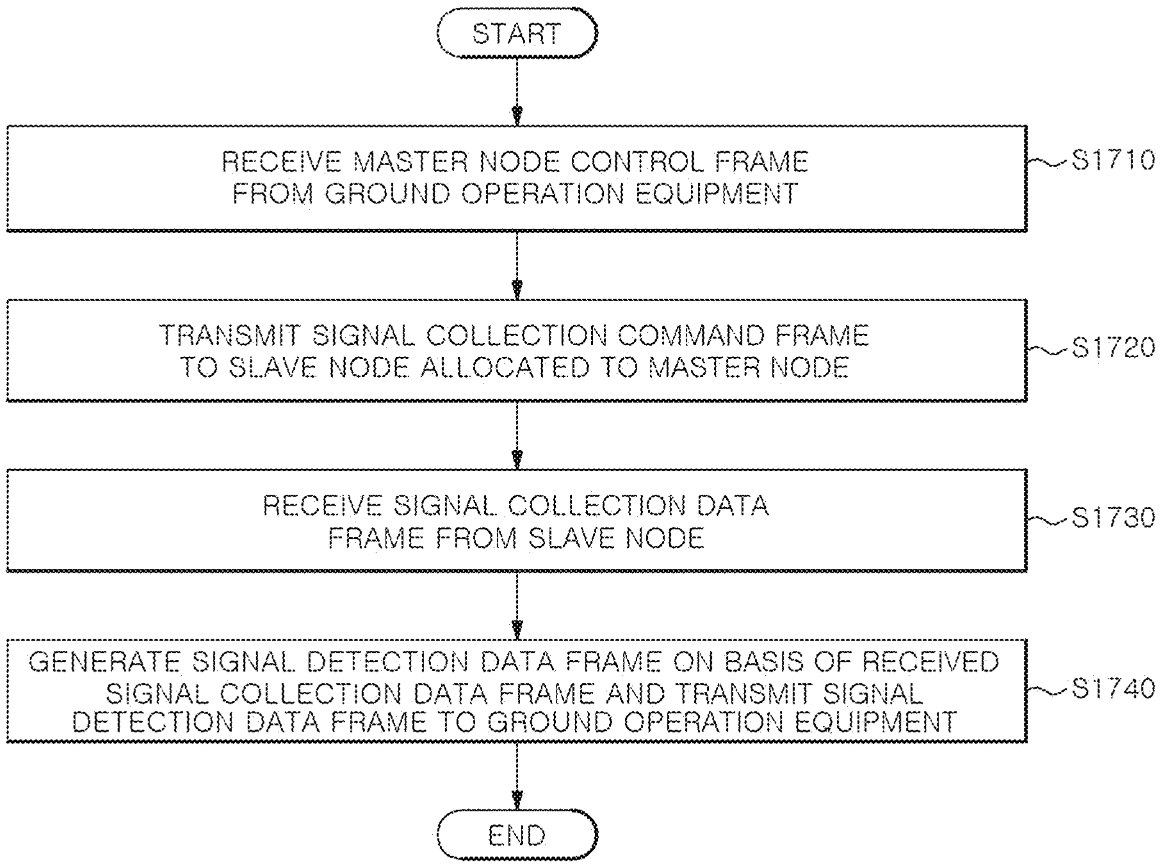

FIG. 17 is a flowchart illustrating A method for receiving data based on distributed beamforming according to another embodiment of the first aspect.

Figure 18:
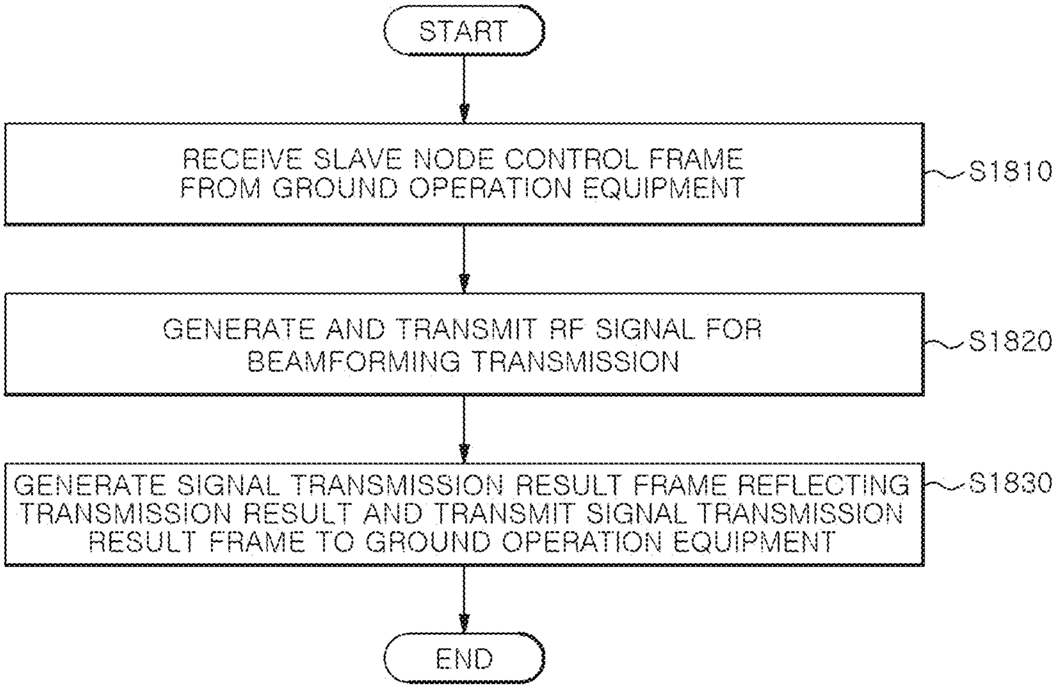

FIG. 18 is a flowchart illustrating A method for transmitting data based on distributed beamforming according to another embodiment of the first aspect of the present disclosure.

Figure 19:
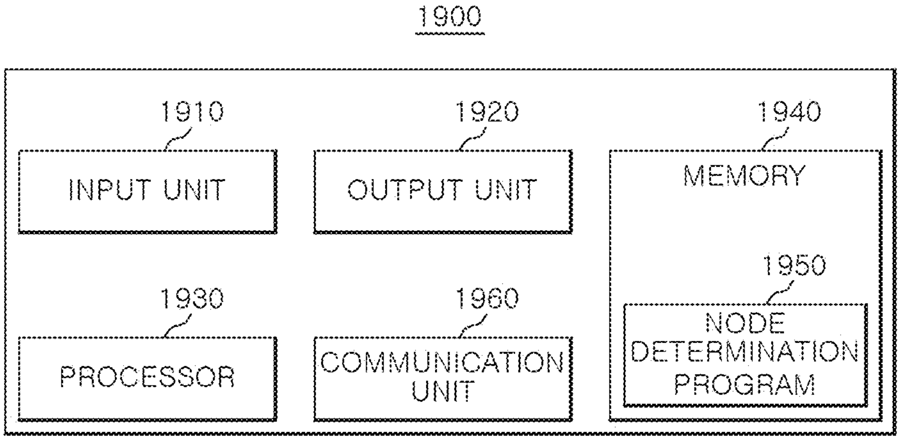

FIG. 19 is a block diagram illustrating ground operation equipment according to a second aspect of the present disclosure.

Figure 20:
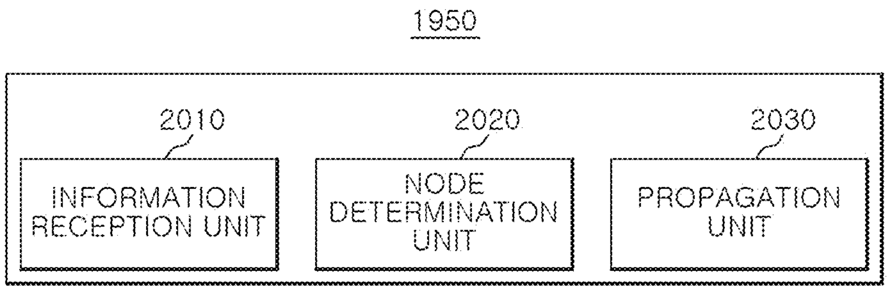

FIG. 20 is a block diagram illustrating functions of a node determination program.

DETAILED DESCRIPTION

In order to implement distributed beamforming using antennas mounted on a plurality of drones that are physically spaced apart, data frames obtained by processing data transmitted and received through each antenna into signals in a form suitable for beamforming need to be transmitted and received between drones in real time. In particular, in order to implement distributed beamforming, a drone that generates a data frame regarding information to be transmitted and received through beamforming signal processing needs to share the generated data frame with other distributed drones and ground operation equipment. The sharing and signal processing of the generated data frame may vary depending on the purpose, such as signal transmission or signal reception using a distributed beamforming method.

When receiving information through distributed beamforming, data frames regarding information to be received are generated in receivers of a plurality of drones, and signal processing for distributed beamforming reception may be applied to the generated data frames. For example, there may be a method in which a plurality of slave drones transmit data frames to which signal processing for beamforming reception is applied to ground operation equipment through a master drone, and a method in which a plurality of slave drones transmit data frames to which signal processing for beamforming reception is not applied to a master drone and the master drone applies signal processing for beamforming reception to the received data frames and transmits the same to ground operation equipment.

When transmitting information through distributed beamforming, data frames regarding information to be transmitted are generated by ground operation equipment, and signal processing for distributed beamforming transmission may be applied to the generated data frames. For example, there may be a method in which ground operation equipment transmits data frames to which signal processing for beamforming transmission is applied to a plurality of slave drones through a master drone, and a method in which ground operation equipment transmits data frames to which signal processing for beamforming transmission is not applied to a master drone, the master drone transmits the received data frames to a plurality of slave drones, and each slave drone applies signal processing for beamforming transmission to the received data frames.

Here, compared to the conventional method of using antennas at fixed positions, when transmitting and receiving information through beamforming using antennas mounted on a plurality of distributed drones, the positions of the antennas may change in real time according to movement of the plurality of drones.

Therefore, in order to implement the method of transmitting and receiving information through distributed beamforming described above, it is required a technology for processing data transmitted and received through antennas mounted on a plurality of drones into signals in a form suitable for beamforming and transmitting and receiving data frames processed into signals in a form suitable for beamforming between drones in real time. That is, a real-time large-capacity wireless data transmission and reception method through which data frames regarding information to be transmitted and received between a master drone and a plurality of slave drones are transmitted and shared is required.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 1:
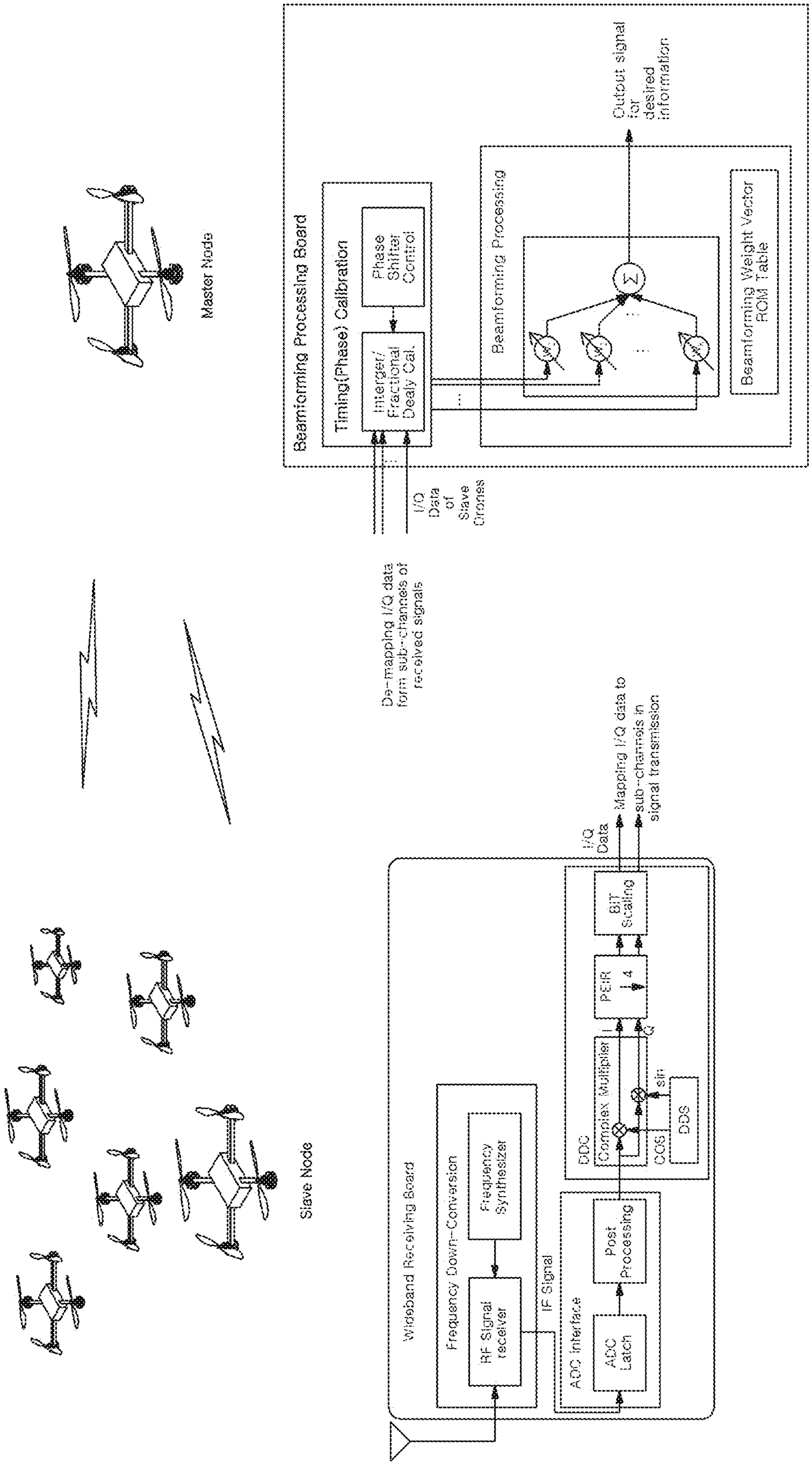
FIG. 1 is a diagram showing a master node, slave nodes, and a signal processor for each node of a plurality of distributed moving objects for implementing a method for transmitting and receiving data based on distributed beamforming according to the present disclosure.

FIG. 1 is a diagram showing a master node, slave nodes, and a signal processor for each node of a plurality of distributed moving objects for implementing a method for transmitting and receiving data based on distributed beamforming according to the present disclosure.

The master node and the slave node may refer to nodes corresponding to a master drone and slave drones. The master node and the slave nodes are equipped with antennas and can communicate with external devices.

The master node may form a multiple access wireless link to transmit/receive large amounts of data to/from a plurality of slave nodes.

The master node may be determined according to a control command from ground operation equipment.

When one node is determined as a master node, the master node may be determined among distributed moving objects by calculating a combination that allows data transmission with maximum transmission efficiency through the remaining slave nodes excluding the determined master node.

For example, a combination that allows data transmission with maximum transmission efficiency may be calculated based on at least one of location information of distributed nodes, a signal-to-noise ratio (SNR), a transmission bandwidth, and a modulation and coding scheme (MCS) level used in the wireless link to determine a master node.

Hereinafter, a method of determining a master node using information on the distance between nodes according to the locations thereof and a signal-to-noise ratio (SNR) at a receiving node will be described in detail.

In a process of determining a single master node and N slave nodes, when data transmitted from an i-th node is received by a j-th node, the received signal strength may be defined as Formula 1.

$$r_{j,i} = P_i G_i G_j L_{j,i} \qquad \text{[Formula 1]}$$

Here, $P_i$ is the transmission strength of the i-th node, $G_i$ is the transmission antenna gain of the i-th node, $G_j$ is the reception antenna gain of the j-th node, and $L_{j,i}$ is path loss $(4\pi f_c d_{j,i}/c)^2$ according to the distance $d_{j,i}$ between the i-th node and the j-th node. Here, c represents the speed of light and $f_c$ represents a carrier frequency used when transmitting data from the i-th node to the j-th node.

When data transmitted from the i-th node is received by the j-th node, the signal-to-noise ratio (SNR) of the received signal may be expressed as $\mu_{j,i}=r_{j,i}/N_j$. Here, $N_j=-174$ (dBm/Hz)+NF+10 $\log_{10} W_j$ represents a noise signal strength including a bandwidth $W_j$ of radio resources allocated to the j-th node and a receiver noise figure NF.

If the j-th node is determined as a random master node, the transmission efficiency when transmitting data from the remaining N nodes to the master node may be determined using Formula 2.

$$\eta_j = \sum_{i=0,i\neq j}^{N} \log_2(1+\mu_{j,i}) \qquad \text{[Formula 2]}$$

Additionally, a master node index that can maximize transmission efficiency may be determined as represented by Formula 3.

$$j_{Master} = \underset{j\in|0,\ldots,N|}{\operatorname{argmax}} \sum_{i=0,i\neq j}^{N} \log_2(1+\mu_{j,i}), \qquad \text{[Formula 3]}$$

Hereinafter, signal processors of the master node and the slave nodes of FIG. 1 will be described.

Conventionally, when data is transmitted through a physically fixed antenna, a wideband receiving board and a beamforming processing board that performs beamforming processing are connected by wire. On the other hand, in order to perform the method for transmitting and receiving data based on distributed beamforming according to the present disclosure, a master drone and slave drones that are physically spaced and continuously moving are used, and thus the wideband receiving board and the beamforming processing board cannot be connected by wire.

Therefore, according to one embodiment of the present disclosure, the wideband receiving board may be included in the slave node, and the beamforming processing board may be included in the master node. Here, the wideband receiving board may include a frequency down-converter, an analog-to-digital converter (ADC) interface, and a digital down-converter (DDC). Additionally, the beamforming processing board may include a timing calibrator and a beamforming processor.

According to one embodiment of the present disclosure, the slave node may receive an RF signal and transmit I/Q data converted from the received RF signal through the frequency down-converter, the ADC interface, and the digital down-converter to the master node. The master node may perform beamforming on the I/Q data received from the slave node for data transmission and reception based on beamforming.

According to another embodiment of the present disclosure, the slave node may process I/Q data into a form suitable for Wi-Fi communication and transmit the processed I/Q data to the master node. Upon reception of the I/Q data processed into a form suitable for Wi-Fi communication, the master node may restore the I/Q data to the original form thereof and perform beamforming on the I/Q data.

Figure 2:
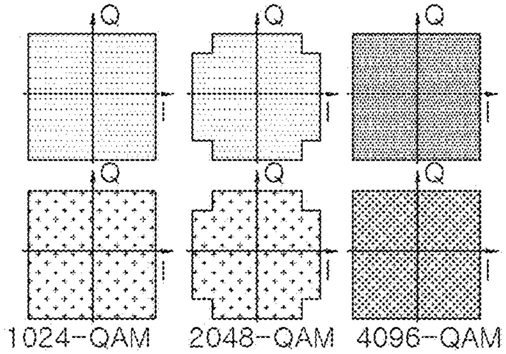
FIG. 2 illustrates an MCS table showing MCS levels applied to Wi-Fi 7 of IEEE802.16be and modulation symbol constellation.

FIG. 2 is a diagram showing an MCS table and modulation symbol constellation in a wireless communication system.

According to another embodiment of the present disclosure, a master node may be determined among distributed moving objects using an MCS level and a data transmission bandwidth for each sub-channel of a wireless link used when data is transmitted and received.

FIG. 2 illustrates an MCS table showing MCS levels applied to Wi-Fi 7 of IEEE802.16be and modulation symbol constellation. Since the MCS level used for data transmission changes depending on the wireless link signal environment, the MCS level may directly affect the amount of data transmission.

Hereinafter, a method of determining a master node by directly reflecting changes in real-time transmission amount due to MCS level changes will be described in detail.

In the MCS table of FIG. 2, modulation methods and channel coding rates for transmission symbols for data transmission and reception are determined. For example, the number of transmission data bits for the modulation methods and coding rates according to the MCS table of FIG. 2 may be calculated as shown in Table 1.

TABLE 1

| | Modulation | | Coding | Number of transmission data |
|---|---|---|---|---|
| MCS | Order | # of Bits | Rate | bits (Tx Bits) |
| 0 | BPSK | 1 | 1/2 | 0.5 |
| 1 | QPSK | 2 | 1/2 | 1.0 |
| 2 | QPSK | 2 | 3/4 | 1.5 |
| 3 | 16-QAM | 4 | 1/2 | 2.0 |
| 4 | 16-QAM | 4 | 3/4 | 3.0 |
| 5 | 64-QAM | 6 | 2/3 | 4.0 |
| 6 | 64-QAM | 6 | 3/4 | 4.5 |
| 7 | 64-QAM | 6 | 5/6 | 5.0 |
| 8 | 256-QAM | 8 | 3/4 | 6.0 |
| 9 | 256-QAM | 8 | 5/6 | 6.7 |
| 10 | 1024-QAM | 10 | 3/4 | 7.5 |
| 11 | 1024-QAM | 10 | 5/6 | 8.3 |
| 12 | 4096-QAM | 12 | 3/4 | 9 |
| 13 | 4096-QAM | 12 | 5/6 | 10 |

The number of transmission data bits may be determined by the number of transmission bits $\alpha_{j,i}$ and the coding rate $\beta_{j,i}$ according to the modulation method with respect to the MCS level used when data is transmitted from the i-th node to the j-th node.

When the j-th node is selected as a random master node, the master node index that can maximize the real-time transmission rate when data is transmitted from the remaining N nodes to the master node may be determined as represented by Formula 4.

$$j_{Master} = \underset{j\in|0,\ldots,N|}{\operatorname{argmax}} \sum_{i=0,i\neq j}^{N} \alpha_{j,i}\beta_{j,i}W_i \qquad \text{[Formula 4]}$$

Here, $W_i$ represent the bandwidth used when data is transmitted from the i-th node to the random master node.

Considering distributed beamforming reception, in order to detect a target RF signal, the wideband receiving board of each slave node may convert the target RF signal received through an antenna into a digital signal by applying frequency tuning and digital sampling to the target RF signal.

Next, the RF signal converted into a digital signal may be output as intermediate frequency (IF) data down-converted to a baseband frequency. IF data from each slave node may be transmitted to the master node through a sub-channel allocated to each slave node of a multiple access wireless link.

Finally, the beamforming processing board mounted on the master node may obtain desired information of the received target signal by correcting the received baseband IF data of each slave node and performing beamforming signal processing.

Figure 3:
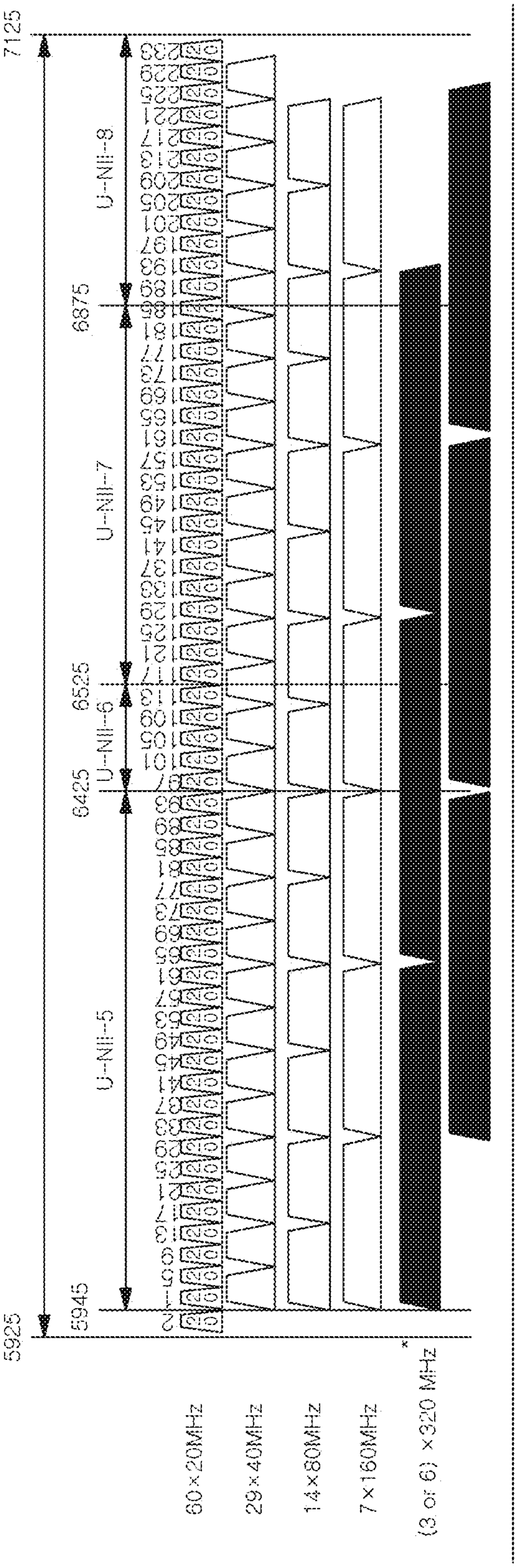
FIG. 3 and FIG. 4 are diagrams showing a resource allocation structure and multi-node resource allocation of an orthogonal frequency division multiple access system that can be considered for transmitting and receiving a large amount of data between distributed moving objects.
Figure 4:
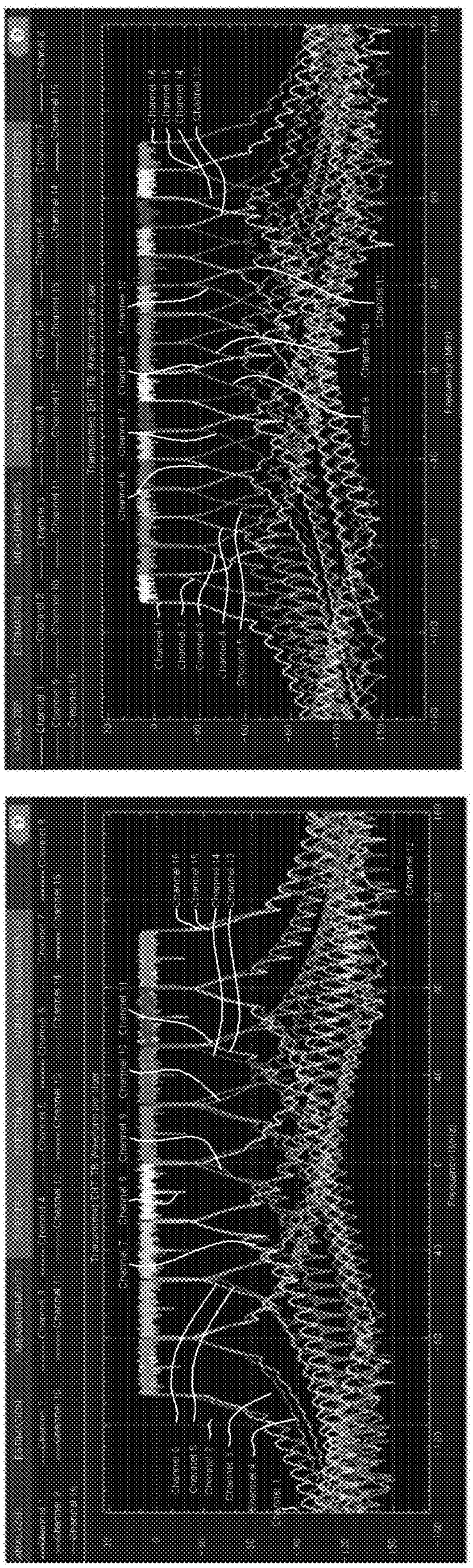

FIG. 3 and FIG. 4 are diagrams showing a resource allocation structure and multi-node resource allocation of an orthogonal frequency division multiple access system that can be considered for large-capacity data transmission and reception between distributed moving objects.

For real-time large-capacity data communication between multiple nodes, a multiple access system such as time division, frequency division, code division, or orthogonal frequency division may be applied to a multiple access wireless link. For example, FIG. 4 shows frequency spectrum results of multi-node resource allocation for cases below when 16 sub-channel resources are allocated to multiple nodes in a single transmission channel with a bandwidth of 320 MHz when the resource allocation structure of the orthogonal frequency division multiple access system of the Wi-Fi 7 standard is applied.

(1) Case in which 8 sub-channels having a bandwidth of 40 MHz are allocated and 2 nodes per sub-channel transmit and receive data simultaneously (2) Case in which 16 sub-channels having a bandwidth of 20 MHz are allocated, one node per sub-channel transmits and receives data, and a total of 16 nodes transmit and receive data simultaneously.

Figure 5:
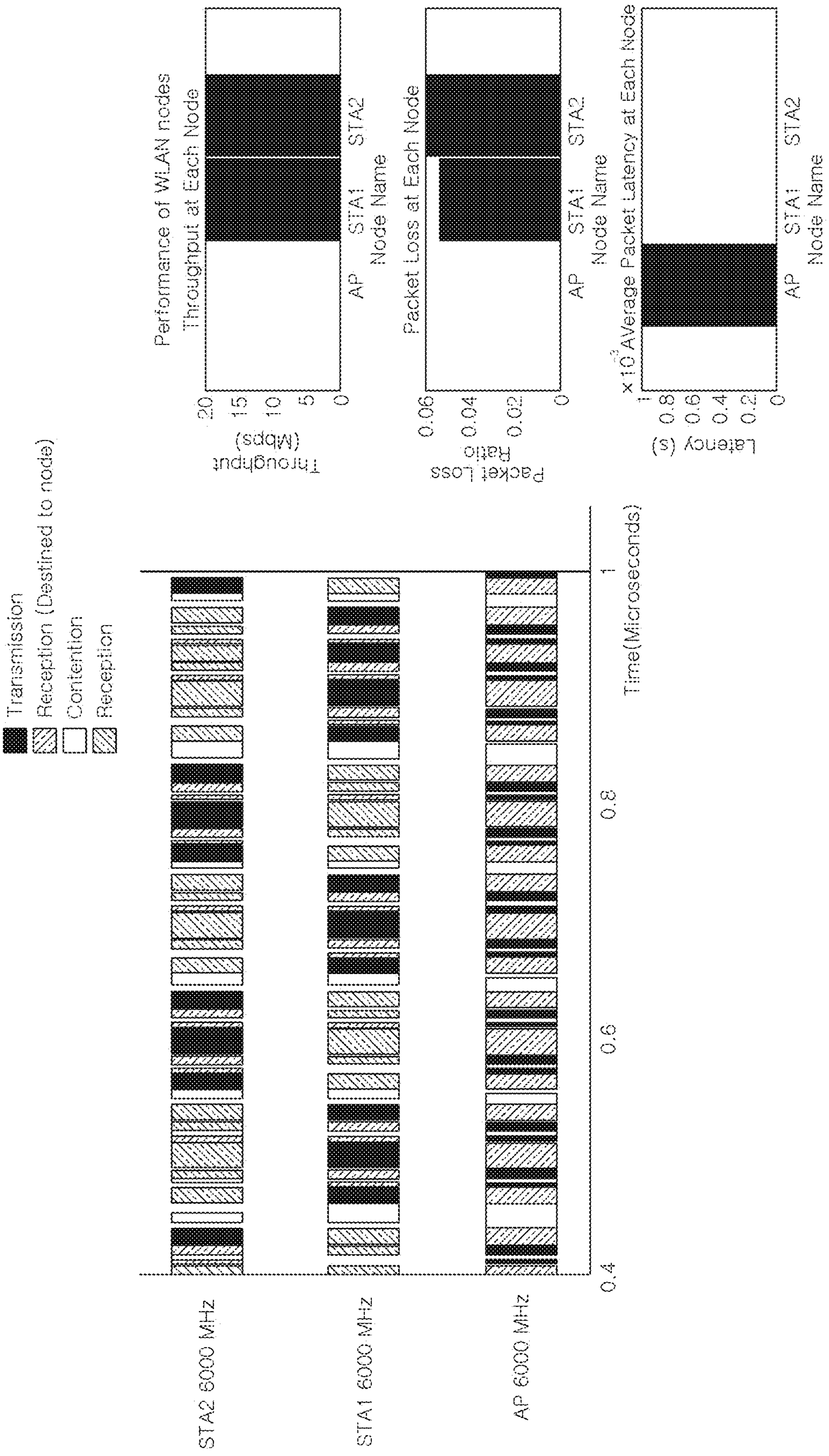
FIG. 5 shows a data communication processing rate of each node, a packet loss rate of each node, and an average packet waiting time in a case where 8 sub-channels having a bandwidth of 40 MHz are allocated to an orthogonal frequency division multiple access system with a bandwidth of 320 MHz, two nodes per sub-channel simultaneously utilize radio resources and 16 nodes simultaneously transmit and receive data.

FIG. 5 and FIG. 6 show a data communication processing speed, a packet loss rate, and average packet waiting time of each node for each case as results of simulation performed by applying an orthogonal frequency division multiple access system to implement a real-time large-capacity data transmission and reception wireless link between a single master node and 16 slave nodes.

FIG. 5 shows a data communication processing rate of each node, a packet loss rate of each node, and an average packet waiting time in a case where 8 sub-channels having a bandwidth of 40 MHz are allocated to an orthogonal frequency division multiple access system with a bandwidth of 320 MHz, two nodes per sub-channel simultaneously utilize radio resources and 16 nodes simultaneously transmit and receive data.

A transmission and reception channel with a bandwidth of 320 MHz was utilized in the center frequency band of 6 GHZ, and it is ascertained that the data communication processing speed at which transmission from slave nodes STA1 and STA2 to a master node AP can be performed is approximately 20 Mbps, and a packet latency of 1 ms and packet loss of 4 to 5% for each node occur during data transmission and reception.

FIG. 6 shows a data communication processing rate of each node, a packet loss rate of each node, and an average packet waiting time in a case where a single node per sub-channel with a bandwidth of 20 MHz utilizes radio resources and 16 nodes simultaneously transmit and receive data in an orthogonal frequency division multiple access system with a bandwidth of 320 MHz.

A transmission and reception channel with a bandwidth of 320 MHz was utilized as in the case shown in FIG. 5, and it is ascertained that the data communication processing speed at which transmission from a slave nodes STA1 to a master node AP can be performed is approximately 40 Mbps, and a packet latency of 0.4 ms and packet loss of 2.8% for each node occur during data transmission and reception.

It can be ascertained from comparison of the simulation results of FIG. 5 and FIG. 6 that collision between data transmission and reception (contention in FIG. 5 and FIG. 6) is reduced and thus transmission efficiency is improved in the case of FIG. 6 in which a single node per sub-channel with a bandwidth of 20 MHz uses radio resources and 16 nodes simultaneously transmit and receive data rather than in the case of FIG. 5 in which 8 sub-channels with a bandwidth of 40 MHz are allocated, two nodes per sub-channel use radio resources, and 16 nodes simultaneously transmit and receive data.

FIG. 7 to FIG. 10 illustrate data transmission and reception link configurations having different combinations of a master node, slave nodes, and a relay node.

FIG. 7 is a diagram showing a data transmission and reception link configuration in which a single master node (GO, group owner) and a single slave node group (GM, group member) are allocated to moving objects distributed through ground operation equipment control.

Figure 8:
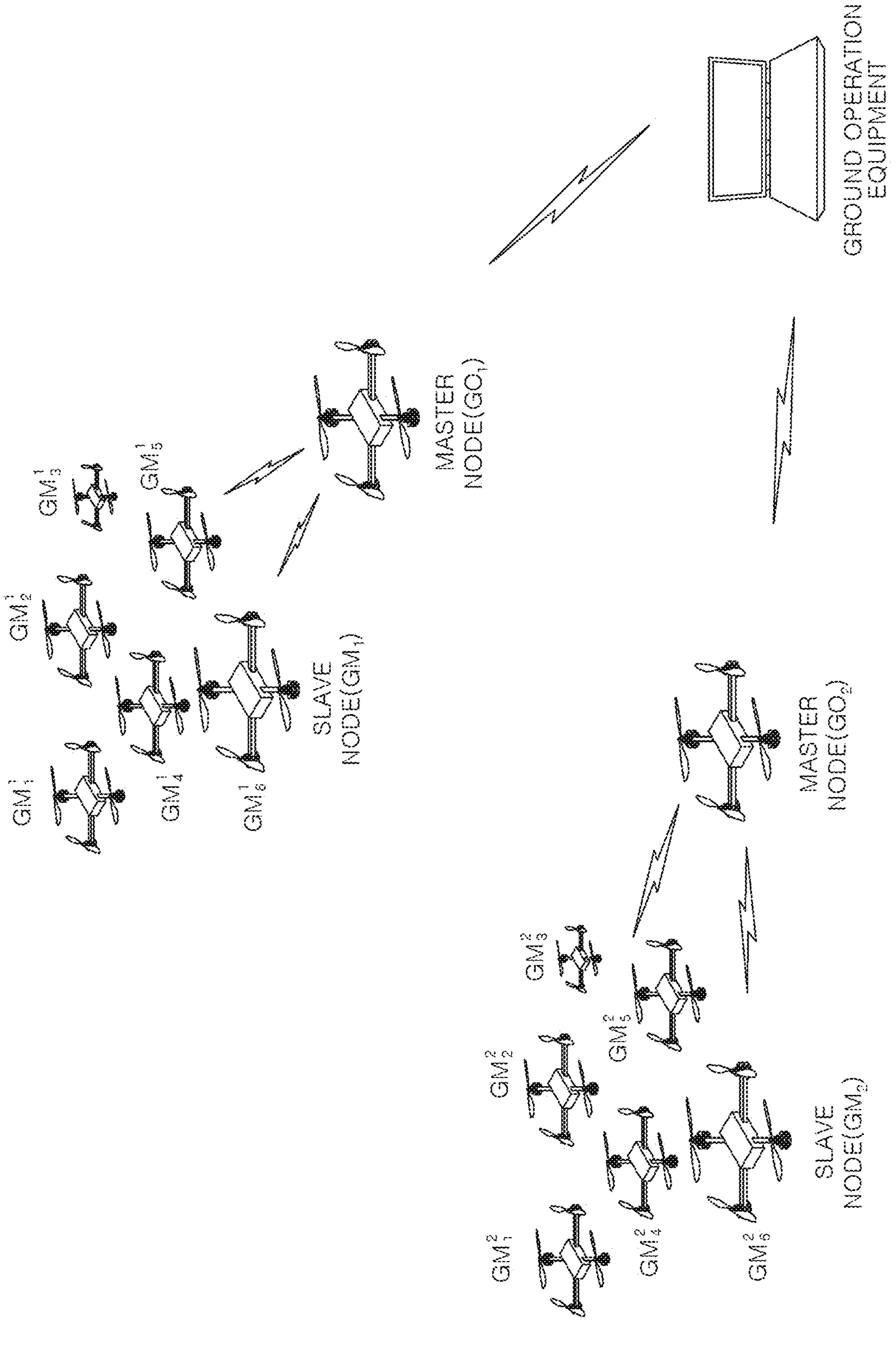
FIG. 8 is a diagram showing a data transmission and reception link configuration in which M multiple slave node groups $$GM_n^m,\ m = 1, 2, \ldots , M,\ n = 1, 2, \ldots , N$$

FIG. 8 is a diagram showing a data transmission and reception link configuration in which M slave node groups $$GM_n^m,\ m = 1, 2, \ldots, M,\ n = 1, 2, \ldots, N$$

composed of M master nodes and N slave nodes are allocated.

FIG. 9 is a diagram showing a data transmission and reception link configuration in which a relay node (GR, group relay) is allocated to support long-distance data communication for the data transmission and reception link of FIG. 7.

FIG. 10 shows a diagram showing a data transmission and reception link configuration in which a relay node GR is allocated to support long-distance data communication for the data transmission and reception link of FIG. 8.

As shown in FIG. 7 to FIG. 10, the method of performing distributed beamforming transmission and reception according to the present disclosure may include a step of allocating a master node and slave nodes with reference to self-positioning information of each node or signal-to-noise ratio (SNR) information of a transceiver mounted on each node in a target RF signal transmission and reception band for moving objects distributed through ground operation equipment control, and a step of checking the quality of the communication channel between the allocated master node and ground operation equipment, determining a communication method, and configuring a control channel. Here, the communication channel quality may include at least one of the signal-to-noise ratio of the transmission and reception signal environment and MCS level information of the communication channel. Additionally, the communication method between the master node and the ground operation equipment may refer to a direct path method as shown in FIG. 7 and FIG. 8 or an N-hop relay method as shown in FIG. 9 and FIG. 10.

In addition, the method of performing distributed beamforming transmission and reception according to the present disclosure may further include a step of checking reception levels of the target RF signal received by the slave nodes or reception levels of data frames transmitted from the slave nodes to the master node and determining the number of channels to be used for distributed beamforming, and a step of checking the determined number of channels and information on slave nodes used for distributed beamforming, and applying a beamforming algorithm suitable for the number of channels.

FIG. 11 and FIG. 12 illustrate message flows showing specific methods of performing distributed beamforming transmission and reception by configuring the above-described data transmission and reception link. FIG. 11 illustrates a message flow for implementing a distributed beamforming reception method using a master node and a slave node. FIG. 12 illustrates a message flow for implementing a distributed beamforming transmission method using a master node and a slave node.

First, the ground operation equipment may request at least one of self-positioning information and SNR information of each node in order to determine a master node and a slave node among initially started and distributed moving objects.

Subsequently, the ground operation equipment may propagate a master/slave node determination frame to all nodes through a distributed beamforming-based data transmission and reception link using the received information. Here, the master/slave node determination frame may include at least one of master/slave node determination information, information on allocated master/slave nodes and indexes thereof, a sub-channel index allocated for each node, and sub-channel bandwidth information.

Subsequently, the ground operation equipment may transmit a master node control frame to the master node through the distributed beamforming-based data transmission and reception link. Here, the master node control frame may include at least one of information on the number of designated relay nodes used, index information on slave nodes allocated to the master node, information on the number of distributed beamforming channels, and signal transmission and reception commands.

Hereinafter, the message flow applied to implement distributed beamforming reception shown in FIG. 11 will be described in detail.

When information is received through distributed beamforming, the master node that has received control data from the ground operation equipment may transmit a signal collection command frame to slave nodes mapped and allocated to the master node through the distributed beamforming-based data transmission and reception link. Here, the signal collection command frame may include at least one of a frequency range, a signal collection bandwidth, and signal detection threshold information.

Subsequently, each slave node that has received the signal collection command frame may collect and detect a target RF signal, generate collected signal IF data, and generate a signal collection data frame that is reply data to the collection command. Here, the signal collection data frame may include at least one of channel quality information (CQI), which is channel quality information of a sub-channel used, an MCS level used to suit a channel quality status at the time of generating the signal collection data frame, real-time location information of the slave node, and the frequency of the collected/detected target RF signal, correction data that is collection frequency phase/time delay information, and digitized and frequency down-converted IF data of the collected RF signal.

Subsequently, each slave node in the distributed beamforming-based data transmission and reception link may transmit the generated signal collection data frame to the master node using an allocated sub-channel.

Subsequently, the master node that has received the signal collection data frame through a plurality of sub-channels may generate a signal detection data frame. Here, the signal detection data frame may include at least one of beamforming received using multi-channel IF data, the number of signals detected by performing direction detection signal processing, frequency information, signal strength, demodulation result, signal detection band spectrum data, and collected CQI and location information of a slave node for each channel.

Finally, the master node may transmit the generated signal detection data frame to ground operation equipment through the distributed beamforming-based data transmission and reception link.

Hereinafter, the message flow applied to implement distributed beamforming transmission shown in FIG. 12 will be described in detail.

When information is transmitted through distributed beamforming, the master node that has received control data from the ground operation equipment may transmit a signal transmission data frame to slave nodes mapped and allocated to the master node through the distributed beamforming-based data transmission and reception link. Here, the signal transmission data frame may include at least one of a frequency range, a signal transmission bandwidth, beamforming transmission azimuth/elevation, transmission output level information, and transmission signal IF data.

Subsequently, each slave node that has received the signal transmission data frame may perform signal processing to generate an RF signal for each node for beamforming transmission, transmit the RF signal, and generate a signal transmission result frame. Here, the signal transmission result frame may include at least one of CQI, which is channel quality information of the sub-channel used, an MCS level used to suit the channel quality status at the time of generating the signal transmission result frame, real-time location information of the slave node, and beamforming transmission result data.

Subsequently, each slave node of the distributed beamforming-based data transmission and reception link may transmit the generated signal transmission result frame to the master node using an allocated sub-channel.

Finally, the master node that has received the signal transmission result frame through a plurality of sub-channels may transmit the received signal transmission result frame to the ground operation equipment through the distributed beamforming-based data transmission and reception link.

FIG. 13 illustrates a message flow through which the ground operation equipment serves as a master node to implement a distributed beamforming reception method. In addition, FIG. 14 illustrates a message flow through which the ground operation equipment serves as a master node to implement a distributed beamforming transmission method.

First, the ground operation equipment may request at least one of self-positioning information and SNR information of each node in order to configure slave nodes of initially started and distributed moving objects.

Subsequently, the ground operation equipment may propagate a slave node control frame to all nodes through a distributed beamforming-based data transmission and reception link using the received information. Here, the slave node control frame may include at least one of information on the number of slave nodes, slave node indexes, a sub-channel index allocated for each node, and sub-channel bandwidth information.

Hereinafter, the message flow applied to implement distributed beamforming reception shown in FIG. 13 will be described in detail.

When information is received through distributed beamforming, the ground operation equipment may transmit the slave node control frame to all slave nodes through the distributed beamforming-based data transmission and reception link. Here, the slave node control frame may include at least one of information on the number of slave nodes, slave indexes, an allocated sub-channel index, a sub-channel bandwidth, information on the number of designated relay nodes used, and a signal reception command.

Subsequently, each slave node that has receive the slave node control frame may collect/detect a target RF signal to generate collected signal IF data and generate a signal collection data frame that is reply data to a collection command. Here, the signal collection data frame may include at least one of CQI, which is the channel quality information of the sub-channel used, an MCS level used to suit the channel quality status at the time of generating the signal collection data frame, real-time location information of the slave node, the frequency of the collected/detected target RF signal, correction data that is collection frequency phase/time delay information, and digitized and frequency down-converted IF data of the collected RF signal.

Subsequently, each slave node of the distributed beamforming-based data transmission and reception link may transmit the generated signal collection data frame to the ground operation equipment using an allocated sub-channel.

Finally, the ground operation equipment that has received the signal collection data frame through a plurality of sub-channels may display at least one of beamforming received using multi-channel IF data, the number of signals detected by performing direction detection signal processing, frequency information, signal strength, demodulation result, signal detection band spectrum data, and collected CQI and location information of a slave node for each channel.

Hereinafter, a message flow applied to implement distributed beamforming transmission shown in FIG. 14 will be described in detail.

When information is transmitted through distributed beamforming, the ground operation equipment may transmit a slave node control frame to all slave nodes through a distributed beamforming-based data transmission and reception link. Here, the slave node control frame may include at least one of information on the number of slave nodes, indexes of the slave nodes, allocated sub-channel indexes, sub-channel bandwidths, information on the number of designated relay nodes used, and transmission signal information.

Subsequently, each slave node that has received the slave node control frame may perform signal processing to generate an RF signal for each node, transmit the RF signal, and generate a signal transmission result frame for beamforming transmission. Here, the signal transmission result frame may include at least one of CQI, which is channel quality information of a sub-channel used, an MCS level used to suit the channel quality status at the time of generating the signal transmission result frame, real-time location information of the slave node, and beamforming transmission result data.

Finally, each slave node in the distributed beamforming-based data transmission and reception link may transmit the generated signal transmission result frame to the ground operation equipment through the allocated sub-channel.

FIG. 15 is a flowchart illustrating a method for transmitting and receiving data based on distributed beamforming according to a first aspect of the present disclosure.

As shown in FIG. 15, the method for transmitting and receiving data based on distributed beamforming according to the first aspect of the present disclosure includes step S1510 of determining a master node among a plurality of nodes through ground operation equipment, step S1520 of forming a data transmission and reception channel based on a signal reception level between the master node and a slave node, and step S1530 of transmitting and receiving data between the master node and the slave node through the data transmission and reception channel (S1530).

A radio resource allocation system according to the present disclosure is characterized by allocating the same downlink and uplink radio resources to two or more nodes in a multiple access system such as a time, frequency, code, or orthogonal frequency division system. Nodes may include a master node and a slave node corresponding to a plurality of distributed moving objects.

The step S1520 of forming a data transmission and reception channel may include a step of checking a reception level of a target RF signal received from the slave node or a reception level of a data frame transmitted from the slave node to the master node and determining the number of channels used for distributed beamforming.

In addition, the method for transmitting and receiving data based on distributed beamforming according to the first aspect of the present disclosure may further include a step of checking the determined number of channels and slave node information used for distributed beamforming and applying a beamforming algorithm appropriate to the number of channels.

FIG. 16 is a flowchart illustrating a method of determining a master node according to another embodiment of the first aspect of the present disclosure.

As shown in FIG. 16, the method of determining a master node according to another embodiment of the first aspect of the present disclosure includes step S1610 of receiving at least one of location information of each node, transmission bandwidth, an MCS level used in a wireless link, and SNRs from a plurality of distributed nodes, step S1620 of determining a master node and a slave node allocated to the master node among the plurality of nodes based on the received information, and step S1630 of propagating a node determination frame reflecting the determination result to the nodes.

FIG. 17 is a flowchart illustrating A method for receiving data based on distributed beamforming according to another embodiment of the first aspect.

As shown in FIG. 17, the data reception method based on distributed beamforming according to another embodiment of the first aspect includes step S1710 of receiving a master node control frame from ground operation equipment, step S1720 of transmitting a signal collection command frame to a slave node allocated to a master node, step S1730 of receiving a signal collection data frame from the slave node, and step S1740 of generating a signal detection data frame based on the received signal collection data frame and transmitting the signal detection data frame to the ground operation equipment.

FIG. 18 is a flowchart illustrating A method for transmitting data based on distributed beamforming according to another embodiment of the first aspect of the present disclosure.

As shown in FIG. 18, the data transmission method based on distributed beamforming according to another embodiment of the first aspect of the present disclosure includes step S1810 of receiving a slave node control frame from ground operation equipment, step S1820 of generating an RF signal and transmitting the RF signal for beamforming transmission, and step S1830 of generating a signal transmission result frame reflecting the transmission result and transmitting the signal transmission result frame to the ground operation equipment.

FIG. 19 is a block diagram illustrating ground operation equipment according to a second aspect of the present disclosure.

As shown in FIG. 19, the ground operation equipment 1900 may include an input unit 1910, an output unit 1920, a processor 1930, a memory 1940, and a communication unit 1960.

Hereinafter, an example in which the ground operation equipment 1900 includes the input unit 1910, the output unit 1920, the processor 1930, the memory 1940, and the communication unit 1960 will be described for convenience, but the present disclosure is not limited thereto. That is, each component may be provided outside the ground operation equipment 1900 and operate in association with the ground operation equipment 1900.

The input unit 1910 may include a user interface that receives commands, information, and the like used to control the ground operation equipment 1900. Additionally, the input unit 1910 may be a hardware device (e.g., a keyboard, a mouse, voice input, a touch pad, or the like) that directly receives commands, information, and the like used to control the ground operation equipment 1900.

In one embodiment, the input unit 1910 may receive information required for the method for transmitting and receiving data based on distributed beamforming from a user. Specifically, the user may input information including information related to determination of a master node, a slave node, and a relay node, and information related to distributed beamforming-based data through the input unit 1910.

The output unit 1920 may provide information including information related to determination of a master node, a slave node, and a relay node, and information related to distributed beamforming-based data to the user as visual information through an interface or a display device.

The processor 1930 may control the overall operation of the ground operation equipment 1900 to implement the present disclosure.

The processor 1930 may load a node determination program 1950 and information necessary to execute the node determination program 1950 from the memory 1940 in order to execute the node determination program 1950.

The processor 1930 may control data received from an external device through the communication unit 1960 to be stored in the memory 1940. Additionally, the processor 1930 may control information including information related to determination of a master node, a slave node, and a relay node and information related to distributed beamforming-based data to be transmitted to an external device through the communication unit 1960.

The processor 1930 may refer to a processing device such as a microprocessor, a central processing unit (CPU), a graphic processing unit (GPU), a processor core, a multi-processor, an application-specific integrated circuit (ASIC), a field programmable gate array (FPGA), or a micro-controller unit (MCU), but the present disclosure is not limited to thereto.

The memory 1940 may store the node determination program 1950 and information necessary to execute the node determination program 1950. Additionally, the memory 1940 may store results of processing performed by the processor 1930.

The node determination program 1950 may refer to software including instructions programmed to perform the method according to the present disclosure.

The memory 1940 may store information including information related to determination of a master node, a slave node, and a relay node, and information related to distributed beamforming-based data. Additionally, the memory 1940 can store information received from an external device through the communication unit 1960.

The memory 1940 may refer to a computer-readable storage medium such as a hardware device specially configured to store and execute program instructions, such as magnetic media such as a hard disk, a floppy disk, and a magnetic tape, optical media such as a CD-ROM and a DVD, magneto-optical media such as a floptical disk, a random access memory such as a dynamic random access memory (DRAM) or a static random access memory (SRAM), or a flash memory, but the present disclosure is not limited thereto.

The communication unit 1960 may be a wireless communication module that performs wireless communication using a communication method such as CDMA, GSM, W-CDMA, TD-SCDMA, WiBro, LTE, EPC, 5G, wireless LAN, Wi-Fi, Bluetooth, ZigBee, Wi-Fi Direct (WFD), Ultra Wide Band (UWB), infrared data association (IrDA), Bluetooth low energy (BLE), or near field communication (NFC), but the present disclosure is not limited thereto.

In addition, information input and output through the input unit 1910 and the output unit 1920, information stored in the memory 1940, and information transmitted and received through the communication unit 1960 include all information related to the present disclosure and are not limited to the above-described embodiments.

The functions or operation of the node determination program 1950 will be described in detail with reference to FIG. 20.

FIG. 20 is a block diagram illustrating the function of the node determination program.

As shown in FIG. 20, the node determination program 1950 may include an information reception unit 2010, a node determination unit 1720, and a propagation unit 1730. The information reception unit 2010, the node determination unit 1720, and the propagation unit 1730 are exemplary divisions of the functions of the node determination program 1950, and the present disclosure is not limited thereto.

According to an embodiment, the functions of the information reception unit 2010, the node determination unit 1720, and the propagation unit 1730 may be merged/separated and implemented as a series of instructions included in at least one program.

The information reception unit 2010, the node determination unit 1720, and the propagation unit 1730 may be implemented by the processor 1930, and may refer to a data processing device built into hardware, which has a physically structure circuit to execute functions represented as code or instructions included in the node determination program 1950 stored in the memory 1940.

The operations which will be described below are based on the premise that the operations are performed by the information reception unit 2010, the node determination unit 1720, and the propagation unit 1730 included in the node determination program 1950 of the ground operation equipment 1900, but the present disclosure is not limited thereto. For example, the operations performed by the information reception unit 2010, the node determination unit 1720, and the propagation unit 1730 may be performed by a master node, a slave node, or a relay node.

The information reception unit 2010 may receive at least one of location information, a transmission bandwidth, an MCS level used in a wireless link, and an SNR of each node from a plurality of distributed nodes.

The information reception unit 2010 may receive a signal detection data frame from a master node.

Here, the signal detection data frame may include at least one of beamforming received using multi-channel IF data, the number of signals detected by performing direction detection signal processing, frequency information, signal strength, demodulation result, signal detection band spectrum data, and CQI of a slave node for each channel, and location information of each node.

The information reception unit 2010 may receive a signal transmission result frame from a slave node.

Here, the signal transmission result frame may include at least one of CQI, which is channel quality information of a sub-channel used, an MCS level used to suit the channel quality status at the time of generating the signal transmission result frame, real-time location information of the slave node, and beamforming transmission result data.

The node determination unit 1720 may determine a master node, a slave node allocated to the master node, and a relay node among the plurality of distributed nodes based on received information.

The node determination unit 1720 may determine a master node among the plurality of nodes based on at least one of the location information, transmission bandwidth, and MCS level used in the wireless link of each node, and determine the remaining nodes other than the master node as slave nodes.

There may be two or more master nodes. In this case, slave nodes corresponding to the master nodes may be allocated as slave nodes.

The node determination unit 1720 may determine a master node based on transmission efficiency when data is transmitted from slave nodes to the master node. Here, the transmission efficiency may be determined based on an SNR.

Transmission efficiency may be determined using Formula 5 below.

$$\eta_j = \sum_{i=0, i \neq j}^{N} \log_2(1 + \mu_{j,i}) \quad \text{[Formula 5]}$$

Here, $\eta_j$ is transmission efficiency, N is the number of slave nodes, and $\mu_{j,i}$ is the SNR.

Here, the SNR $\mu_{j,i}$ may be determined using Formula 6 below.

$$\mu_{j,i} = \frac{r_{j,i}}{N_j}$$

Here, $r_{j,i}$ is received signal strength when data is transmitted from the i-th node is received by the j-th node, and $N_j$ is noise signal strength.

Here, the received signal strength may be determined using Formula 7 below.

$$r_{j,i} = P_i G_i G_j L_{j,i} \quad \text{[Formula 7]}$$

Here, $P_i$ is the transmission strength of the i-th node, $G_i$ is the transmission antenna gain of the i-th node, and $G_j$ is the reception antenna gain of the j-th node.

Here, path loss $L_{j,i}$ may be determined using Formula 8 below.

$$L_{j,i} = \left(\frac{4\pi f_c d_{j,i}}{c}\right)^2 \quad \text{[Formula 8]}$$

Here, $d_{j,i}$ is the distance between the i-th node and the j-th node, c is the speed of light, and $f_c$ is the carrier frequency used when data is transmitted from the i-th node to the j-th node.

Here, the noise signal strength may be determined using Formula 9 below.

$$N_j = -174(\text{dBm/Hz}) + NF + 10\log_{10} W_j \quad \text{[Formula 9]}$$

Here, $W_j$ is the bandwidth of radio resources allocated to the j-th node, and NF is a receiver noise figure.

Here, the index of a node capable of maximizing transmission efficiency may be determined using Formula 10 below.

$$j_{Master} = \underset{j \in |0, \ldots, N|}{\text{argmax}} \sum_{i=0, i \neq j}^{N} \log_2(1 + \mu_{j,i}) \quad \text{[Formula 10]}$$

The node determination unit 1720 may determine a node capable of maximizing transmission efficiency as the master node.

When data is transmitted from a slave node to the master node, the node determination unit 1720 may determine a node capable of maximizing a real-time transmission rate as the master node. Here, the real-time transmission rate may be determined based on the number of transmission bits and a coding rate according to the modulation method.

Here, the index of the master node capable of maximizing the real-time transmission rate may be determined using Formula 11 below.

$$j_{Master} = \underset{j \in |0, \ldots, N|}{\text{argmax}} \sum_{i=0, i \neq j}^{N} \alpha_{j,i} \beta_{j,i} W_i \quad \text{[Formula 11]}$$

Here, j is the index of a randomly selected master node, $\alpha_{j,i}$ is the number of transmission bits according to the modulation method, $\beta_{j,i}$ is the coding rate, and $W_i$ is the bandwidth used for data transmission from the i-th node to the j-th node.

The node determination unit 1720 may check the quality of the communication channel between the master node and the ground operation equipment and configure a communication method of the control channel.

Here, the communication channel quality may include at least one of the signal-to-noise ratio of the transmission and reception signal environment and MCS level information of the communication channel. Here, the communication method of the control channel may be one of a direct path method and an N-hop relay method.

If the communication method of the control channel is configured as an N-hop relay method, the node determination unit 1720 may determine number of relay nodes based on at least one of location information between the ground operation equipment and the plurality of nodes, the signal-to-noise ratio of the transmission and reception signal environment, and the MCS level information of the communication channel. Here, the node determination unit 1720 may configure the data transmission and reception channel including a relay node.

There may be two or more slave nodes. In this case, the relay node may be determined from among the slave nodes. Here, the node determination unit 1720 may calculate the index of a slave node determined as a relay node based on at least one of the location information of each slave node, the signal-to-noise ratio of the transmission and reception signal environment, and the MCS level information of the communication channel. Additionally, the node determination unit 1720 may form a data transmission and reception channel based on the index information of the slave node determined as a relay node and a changed number of slave nodes.

The propagation unit 1730 may propagate a node determination frame reflecting the determination result to each node.

Here, the node determination frame may include at least one of master node determination information, slave node determination information, information on the number of master nodes and indexes of the master nodes, information on the number of slave nodes and indexes of the slave nodes, the index of a sub-channel allocated to each node, and sub-channel bandwidth information.

The propagation unit 1730 may transmit a master node control frame to the master node.

Here, the master node control frame may include at least one of information on the number of relay nodes used, information on the indexes of slave nodes allocated to the master node, information on the number of distributed beamforming channels, and a signal transmission and reception command.

The propagation unit 1730 may transmit a slave node control frame to the slave nodes.

Here, the slave node control frame may include at least one of information on the number of slave nodes, the indexes of the slave nodes, the indexes of allocated sub-channels, the bandwidths of the sub-channels, information on the number of designated relay nodes used, and transmission signal information.

As described above, according to the present disclosure, it is possible to implement a wireless data transmission and reception method based on distributed beamforming using a plurality of distributed moving objects capable of wireless signal transmission and reception for beamforming transmission and reception of a target RF signal in a required frequency band.

Specifically, wireless data transmission and reception based on distributed beamforming may be performed by determining a master node and slave nodes among distributed moving objects equipped with RF signal transceivers, securing a stable communication channel connected with ground operation equipment, and configuring a wireless data transmission and reception channel for allocating radio resources that allow multiple nodes to simultaneously access.

In addition, an RF signal for a target signal in a required frequency band may be processed by the transceivers of distributed moving objects, and intermediate frequency (IF) signals processed into digital signals for this purpose may be transmitted and shared between the master node and slave nodes in the form of data frames through a wireless data transmission and reception channel based on distributed beamforming.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for transmitting and receiving data based on distributed beamforming performed by a distributed beamforming-based data transmission and reception system including ground operation equipment and a plurality of distributed nodes, the method comprising:

determining a master node among the plurality of nodes through the ground operation equipment;

forming a data transmission and reception channel based on a signal reception level between the master node and a slave node; and transmitting and receiving data between the master node and the slave node through the formed data transmission and reception channel, wherein determining the master node comprises determining the master node based on transmission efficiency when data is transmitted from the slave node to the master node, and wherein the transmission efficiency is determined based on a signal-to-noise ratio (SNR).

2. The method of claim 1, wherein determining the master node comprises:

determining the master node among the plurality of nodes based on at least one of location information of each node, a transmission bandwidth, or a modulation coding scheme (MCS) level used in a wireless link, and determining remaining nodes other than the master node as slave nodes.

3. The method of claim 2, wherein the master node comprises two or more master nodes, and wherein the slave nodes are allocated to correspond to each master node, respectively.

4. The method of claim 1, wherein the transmission efficiency is determined as $$\eta_j = \sum_{i=0,i\neq j}^{N} \log_2(1+\mu_{j,i}),$$

wherein $\eta_j$ is the transmission efficiency, N is the number of slave nodes, and $\mu_{j,i}$ is the signal-to-noise ratio.

5. The method of claim 4, wherein the signal-to-noise ratio $\mu_{j,i}$ is determined as $\mu_{j,i}=r_{j,i}/N_j$, and wherein $r_{j,i}$ is a received signal strength when data transmitted from an i-th node is received by a j-th node, and $N_j$ is a noise signal strength.

6. The method of claim 5, wherein the received signal strength is determined as $r_{j,i}=P_iG_iG_jL_{j,i}$, and wherein $P_i$ is a transmission strength of the i-th node, $G_i$ is a transmission antenna gain of the i-th node, $G_j$ is a reception antenna gain of the j-th node, $L_{j,i}$ is path loss $(4\pi f_c d_{j,i}/c)^2$ according to a distance $d_{j,i}$ between the i-th node and the j-th node, c is the speed of light, $f_c$ is a carrier frequency used when data is transmitted from the i-th node to the j-th node.

7. The method of claim 5, wherein the noise signal strength is determined as $N_j=-174$ (dBm/Hz)+NF+10 $\log_{10} W_j$, and wherein $W_j$ is a bandwidth of radio resources allocated to the j-th node, and NF is a receiver noise figure.

8. The method of claim 4, wherein an index of a node capable of maximizing the transmission efficiency is determined as $$j_{Master} = \underset{j\in|0,\ldots,N|}{\text{argmax}} \sum_{i=0,i\neq j}^{N} \log_2(1+\mu_{j,i}),$$

and wherein the node configured to maximize the transmission efficiency is determined as the master node.

9. A non-transitory computer-readable storage medium storing computer-executable instructions that cause, when executed by one or more processors, the one or more processors to perform the method of claim 1.

10. The computer-readable storage medium of claim 9, wherein a node determination frame includes at least one of master node determination information, slave node determination information, information on the number of master nodes and indexes of the master nodes, information on the number of slave nodes and indexes of the slave nodes, an index of a sub-channel allocated to each node, or sub-channel bandwidth information.

11. A method for transmitting and receiving data based on distributed beamforming performed by a distributed beamforming-based data transmission and reception system including ground operation equipment and a plurality of distributed nodes, the method comprising:

determining a master node among the plurality of nodes through the ground operation equipment;

forming a data transmission and reception channel based on a signal reception level between the master node and a slave node; and transmitting and receiving data between the master node and the slave node through the formed data transmission and reception channel, wherein determining the master node comprises:

determining a node configured to maximize a real-time transmission rate in response to data being transmitted from the slave node to the master node as the master node, and wherein the real-time transmission rate is determined based on a number of transmission bits and a coding rate according to a modulation method.

12. The method of claim 11, wherein the index of the master node configured to maximize the real-time transmission rate is determined as $$j_{Master} = \underset{j\in|0,\ldots,N|}{\text{argmax}} \sum_{i=0,i\neq j}^{N} \alpha_{j,i}\beta_{j,i}W_i,$$

and wherein j is the index of the randomly selected master node, $\alpha_{j,i}$ is the number of transmission bits according to the modulation method, $\beta_{j,i}$ is the coding rate, and $W_i$ is a bandwidth used when data is transmitted from the i-th node to the j-th node.

13. A method for transmitting and receiving data based on distributed beamforming performed by a distributed beamforming-based data transmission and reception system including ground operation equipment and a plurality of distributed nodes, the method comprising:

determining a master node among the plurality of nodes through the ground operation equipment;

forming a data transmission and reception channel based on a signal reception level between the master node and a slave node;

transmitting and receiving data between the master node and the slave node through the formed data transmission and reception channel; and configuring a communication method of a control channel by checking a quality of a communication channel between the master node and the ground operation equipment.

14. The method of claim 13, wherein the communication channel quality includes at least one of a signal-to-noise ratio of a transmission and reception signal environment, or a modulation coding scheme (MCS) level information of a communication channel.

15. The method of claim 13, wherein the communication method of the control channel is one of a direct path method or an N-hop relay method.

16. The method of claim 15, wherein configuring the communication method includes determining a number of relay nodes based on at least one of location information between the ground operation equipment and the plurality of nodes, a signal-to-noise ratio of a transmission and reception signal environment, and modulation coding scheme (MCS) level information of a communication channel in response to the communication method of the control channel being configured as the N-hop relay method, and wherein forming the data transmission and reception channel comprises configuring the data transmission and reception channel including the relay nodes.

17. The method of claim 16, wherein:

the slave node comprises two or more slave nodes, the relay node is determined from among the slave nodes, configuring the communication method includes calculating the index of the slave node determined as the relay node based on at least one of location information of each slave node, a signal-to-noise ratio of a transmission and reception signal environment, and MCS level information of a communication channel, and forming the data transmission and reception channel comprises forming the data transmission and reception channel based on index information of the slave nodes determined as the relay node and a changed number of slave nodes.

* * * * *